(12) United States Patent
Matsusue et al.

(10) Patent No.: US 10,454,119 B2
(45) Date of Patent: Oct. 22, 2019

(54) FUEL CELL AND FUEL CELL SYSTEM

(71) Applicant: TOYOTA JIDOSHA KABUSHIKI KAISHA, Toyota-shi, Aichi-ken (JP)

(72) Inventors: Masaaki Matsusue, Mishima (JP); Yasushi Araki, Gotenba (JP); Kohsei Yoshida, Gotenba (JP); Hiromi Tanaka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 126 days.

(21) Appl. No.: 15/379,952

(22) Filed: Dec. 15, 2016

(65) Prior Publication Data
US 2017/0179510 A1    Jun. 22, 2017

(30) Foreign Application Priority Data
Dec. 21, 2015 (JP) .................. 2015-248918

(51) Int. Cl.
*H01M 8/04* (2016.01)
*H01M 8/04291* (2016.01)
(Continued)

(52) U.S. Cl.
CPC ..... *H01M 8/04291* (2013.01); *H01M 8/0234* (2013.01); *H01M 8/0258* (2013.01);
(Continued)

(58) Field of Classification Search
CPC ......... H01M 8/04291; H01M 8/04228; H01M 8/04302; H01M 8/04303; H01M 8/0234; H01M 8/0258; H01M 8/04067; H01M 8/04126; H01M 8/04156; H01M 8/04164; H01M 8/04201; H01M 8/04231; H01M 8/0432; H01M 8/04492; H01M 8/04753;
(Continued)

(56) References Cited

U.S. PATENT DOCUMENTS

| 2007/0020497 | A1* | 1/2007 | Ryoichi | H01M 8/04089 |
| | | | | 429/410 |
| 2007/0099040 | A1* | 5/2007 | Morita | H01M 8/04231 |
| | | | | 429/429 |
| 2008/0241635 | A1* | 10/2008 | Sato | H01M 8/023 |
| | | | | 429/404 |

FOREIGN PATENT DOCUMENTS

| EP | 1237219 A1 | 9/2002 |
| JP | 2000-260455 A | 9/2000 |

(Continued)

*Primary Examiner* — Anthony R Jimenez
(74) *Attorney, Agent, or Firm* — Hunton Andrews Kurth LLP

(57) ABSTRACT

A fuel cell includes: a membrane electrode assembly; cathode and anode-side water-repellent layers; a cathode-side separator that includes a cathode gas passage and an air exhaust manifold communicated to the cathode gas passage. The cathode gas passage includes a water exhaust inhibiting portion and a water storage portion. The water exhaust inhibiting portion is provided on a lowermost passage positioned on a lowermost side in a gravity direction. The water storage portion is provided upstream of the water exhaust inhibiting portion such that liquid water is stored in the water storage portion by the water exhaust inhibiting portion. A liquid water connection portion is provided in the water-repellent layer so as to pass through the water-repellent layer such that liquid water flows between the catalyst layer and the water storage portion.

15 Claims, 24 Drawing Sheets

(51) Int. Cl.
   *H01M 8/0258* (2016.01)
   *H01M 8/0432* (2016.01)
   *H01M 8/04007* (2016.01)
   *H01M 8/04119* (2016.01)
   *H01M 8/04082* (2016.01)
   *H01M 8/04228* (2016.01)
   *H01M 8/04223* (2016.01)
   *H01M 8/04302* (2016.01)
   *H01M 8/04303* (2016.01)
   *H01M 8/04492* (2016.01)
   *H01M 8/04746* (2016.01)
   *H01M 8/04858* (2016.01)
   *H01M 8/1004* (2016.01)
   *H01M 8/0234* (2016.01)

(52) U.S. Cl.
   CPC ..... *H01M 8/0432* (2013.01); *H01M 8/04067* (2013.01); *H01M 8/04126* (2013.01); *H01M 8/04156* (2013.01); *H01M 8/04164* (2013.01); *H01M 8/04201* (2013.01); *H01M 8/04228* (2016.02); *H01M 8/04231* (2013.01); *H01M 8/04302* (2016.02); *H01M 8/04303* (2016.02); *H01M 8/04492* (2013.01); *H01M 8/04753* (2013.01); *H01M 8/04768* (2013.01); *H01M 8/04932* (2013.01); *H01M 8/1004* (2013.01); *H01M 2250/20* (2013.01); *Y02E 60/521* (2013.01); *Y02T 90/32* (2013.01)

(58) Field of Classification Search
   CPC ......... H01M 8/04768; H01M 8/04932; H01M 8/1004; Y02E 60/521; Y02T 90/32
   USPC ....................................................... 429/444
   See application file for complete search history.

(56) References Cited

FOREIGN PATENT DOCUMENTS

| | | |
|---|---|---|
| JP | 2001-085037 A | 3/2001 |
| JP | 2008-071633 A | 3/2008 |

\* cited by examiner

FUEL CELL AND FUEL CELL SYSTEM

INCORPORATION BY REFERENCE

The disclosure of Japanese Patent Application No. 2015-248918 filed on Dec. 21, 2015 including the specification, drawings and abstract is incorporated herein by reference in its entirety.

BACKGROUND

1. Technical Field

The present disclosure relates to a fuel cell and a fuel cell system.

2. Description of Related Art

A solid polymer electrolyte fuel cell includes a membrane electrode assembly in which a catalyst electrode layer is disposed on both surfaces of an electrolyte membrane having proton conductivity. In the membrane electrode assembly, an electrochemical reaction progresses, which produces water. Therefore, water is present in the fuel cell. In a case where the fuel cell operates for a long period of time, cationic impurities included in in-take air may be incorporated into water in the fuel cell, or cationic impurities included in materials constituting the electrolyte membrane and the catalyst electrode layer may be eluted into water in the fuel cell. As a result, the power generation performance deteriorates. Therefore, a method of restoring power generation performance in which the amount of cationic impurities is reduced by operating a fuel cell at a high load, by reversing a direction of a current drawn from a fuel cell, or cleaning the inside of a fuel cell with a cleaning solution is known (for example, Japanese Patent Application Publication No. 2001-85037 (JP 2001-85037 A)).

However, in a state where a fuel cell is mounted on a fuel cell vehicle or the like, it is difficult to reverse a direction of a current drawn from the fuel cell or to clean the inside of a fuel cell with a cleaning solution. In addition, in the method of operating a fuel cell at a high load to restore power generation performance, a large amount of water is produced due to the operation of the fuel cell at a high load such that cationic impurities are exhausted to the outside of the fuel cell together with the produced water, thereby restoring the power generation performance. However, in order to maintain an appropriate amount of water in a membrane electrode assembly, a water-repellent layer may be provided on a side surface of the membrane electrode assembly. In this case, even in a case where a large amount of water is produced by operating a fuel cell at a high load, the produced water in the membrane electrode assembly is blocked by the water-repellent layer. Therefore, it is difficult to exhaust the produced water in the form of liquid, and even when a portion of the produced water is exhausted to the outside of the fuel cell, the amount of cationic impurities exhausted together with the produced water is small.

SUMMARY

The disclosure provides a fuel cell and a fuel cell system capable of exhausting a large amount of cationic impurities to the outside of the fuel cell.

According to a first aspect of the disclosure there is provided a fuel cell including: a membrane electrode assembly in which an electrode catalyst layer is provided on both surfaces of an electrolyte membrane; a water-repellent layer that is disposed on at least one surface of the membrane electrode assembly; and a separator that is disposed on a surface of the water-repellent layer opposite to the membrane electrode assembly and includes a gas passage configured to circulate gas, which is supplied to the electrode catalyst layer, and an exhaust manifold connected to the gas passage. In the fuel cell, the gas passage includes a water exhaust inhibiting portion and a water storage portion, the water exhaust inhibiting portion is provided on a lowermost passage positioned on a lowermost side in a gravity direction in a state where the fuel cell is mounted on a vehicle in order to inhibit liquid water from being exhausted to the exhaust manifold, the water storage portion is provided upstream of the water exhaust inhibiting portion such that liquid water is stored in the water storage portion by the water exhaust inhibiting portion, and a liquid water connection portion is provided in the water-repellent layer so as to pass through the water-repellent layer from an electrode catalyst layer side to a separator side such that liquid water flows between the electrode catalyst layer and the water storage portion.

The lowermost passage in the gas passage may include a first portion that extends in a direction intersecting the gravity direction and a second portion that extends upward from the first portion and is connected to the exhaust manifold, the first portion may function as the water storage portion, and the second portion may function as the water exhaust inhibiting portion.

The first portion may extend to a region immediately below the exhaust manifold.

The water exhaust inhibiting portion may be a water-repellent film that is provided on a wall surface of the lowermost passage.

The water exhaust inhibiting portion may be a protrusion that is provided in the lowermost passage.

The fuel cell may further include a gas diffusion layer that is provided between the water-repellent layer and the separator, in which the liquid water connection portion may be provided so as to pass through the water-repellent layer and the gas diffusion layer from the electrode catalyst layer side to the separator side, and the liquid water connection portion and the water storage portion may be in contact with each other.

The gas passage may extend in a direction intersecting the gravity direction and may include a plurality of groove portions along the gravity direction, and a sectional area of a groove portion where the water storage portion is provided among the plurality of groove portions may be larger than sectional areas of other groove portions.

A volume of the water storage portion may be 20% or higher of a maximum water content of the membrane electrode assembly.

The gas passage may extend in a direction intersecting the gravity direction and may include a plurality of groove portions along the gravity direction, and a length of the liquid water connection portion in the gravity direction may be more than a width between one groove portion opposite to the liquid water connection portion among the plurality of groove portions and another groove portion adjacent to the one groove portion.

According to a second aspect of the disclosure, there is provided a fuel cell system including: the fuel cell according to the first aspect; and a gas flow rate controller configured to control a flow rate of gas circulating in the gas passage. When the fuel cell is stopped or activated, the gas flow rate controller is configured to circulate gas in the gas passage at a second gas flow rate which is higher than a first gas flow rate corresponding to an amount of power generated based on a required output for the fuel cell.

The gas flow rate controller may be configured to circulate gas at the second gas flow rate in a case where a total operating time or an immediately previous operating time of the fuel cell is a first predetermined time or longer, and may be configured not to circulate gas at the second gas flow rate in a case where the total operating time or the immediately previous operating time is shorter than the first predetermined time.

The gas flow rate controller may be configured to circulate gas at the second gas flow rate in a case where an immediately previous stoppage time of the fuel cell is a second predetermined time or longer, and may be configured not to circulate gas at the second gas flow rate in a case where the immediately previous stoppage time is shorter than the second predetermined time.

The fuel cell system may further include: a coolant passage configured to circulate a coolant which is supplied to the fuel cell to cool the fuel cell; a temperature detector that detects a temperature of the fuel cell; and a coolant circulation controller that is configured to control circulation of the coolant in the coolant passage, in which the coolant circulation controller may be configured to circulate the coolant in the coolant passage until the temperature of the fuel cell is lower than a first predetermined temperature after power generation of the fuel cell is stopped, and the gas flow rate controller may be configured to circulate gas at the second gas flow rate after the temperature of the fuel cell is lower than the first predetermined temperature and circulation of the coolant is stopped.

The fuel cell system may further include: a power generation controller configured to cause, in a case where the temperature of the fuel cell is lower than a second predetermined temperature when a signal for stopping the fuel cell is received, the fuel cell to generate power until the temperature of the fuel cell is the second predetermined temperature or higher, in which the coolant circulation controller may be configured to circulate the coolant in the coolant passage until the temperature of the fuel cell is lower than the first predetermined temperature after the temperature of the fuel cell is the second predetermined temperature or higher and the power generation of the fuel cell is stopped.

The power generation controller may be configured to cause the fuel cell to generate power until the temperature of the fuel cell is the second predetermined temperature or higher by reducing a supply amount of gas to be less than that during the power generation based on the required output for the fuel cell.

According to the disclosure, a large amount of cationic impurities can be exhausted to the outside of a fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings.

Figure 1A:
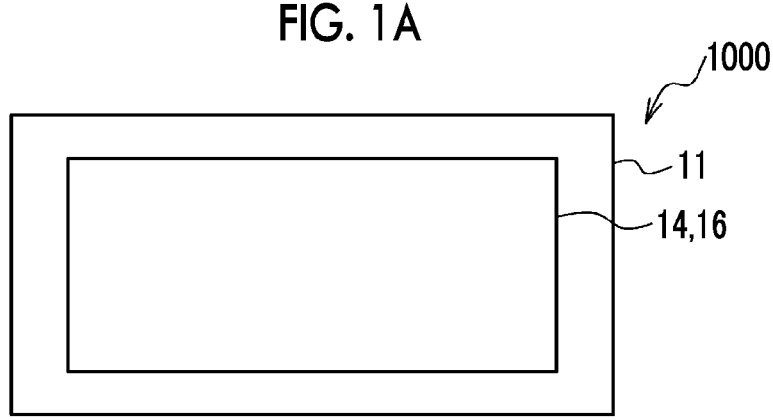
FIG. 1A is a plan view showing a part of a single cell of a fuel cell according to a first embodiment.
Figure 1B:
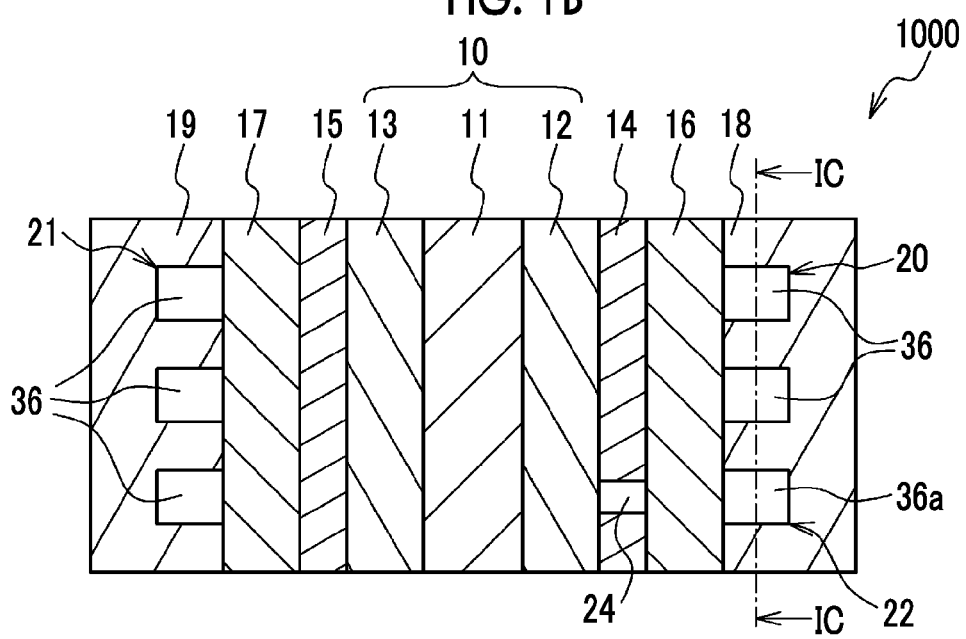
FIG. 1B is a sectional view showing the single cell of the fuel cell according to the first embodiment.
Figure 1C:
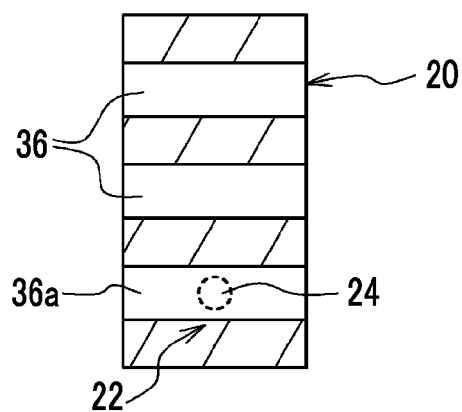
FIG. 1C is a sectional view taken along line IC-IC of FIG. 1B.

A fuel cell according to a first embodiment is a solid polymer electrolyte fuel cell which generates power by the supply of a fuel gas (for example, hydrogen) and an oxidant gas (for example, air) as reaction gases. This fuel cell has a stack structure in which plural single cells are stacked and is mounted on, for example, a fuel cell vehicle or an electric vehicle. FIG. 1A is a plan view showing a part of a single cell 1000 of the fuel cell according to the first embodiment. FIG. 1B is a sectional view showing the single cell 1000 of the fuel cell according to the first embodiment. FIG. 1C is a sectional view taken along line IC-IC of FIG. 1B. As shown in FIG. 1B, the single cell 1000 includes a membrane electrode assembly 10 in which a cathode catalyst layer 12 and an anode catalyst layer 13, which are electrode catalyst layers, are formed on both surfaces of an electrolyte membrane 11. The electrolyte membrane 11 is a solid polymer membrane which is formed of a fluororesin material or a hydrocarbon resin material and has excellent proton conductivity in a wet state. The cathode catalyst layer 12 and the anode catalyst layer 13 include: carbon particles (for example, carbon black) on which a catalyst for causing an electrochemical reaction to progress (for example, platinum or a platinum-cobalt alloy) is supported; and an ionomer having proton conductivity.

On both surfaces of the membrane electrode assembly 10, a pair of water-repellent layers (a cathode-side water-repellent layer 14 and an anode-side water-repellent layer 15) for maintaining an appropriate amount of water in the membrane electrode assembly 10, a pair of gas diffusion layers (a cathode gas diffusion layer 16 and an anode gas diffusion layer 17), and a pair of separators (a cathode-side separator 18 and an anode-side separator 19) are disposed. As shown in FIG. 1A, the cathode-side water-repellent layer 14 and the cathode gas diffusion layer 16 are smaller than the electrolyte membrane 11 in external shape. The same can be applied to the anode-side water-repellent layer 15 and the anode gas diffusion layer 17. In a peripheral region of the electrolyte membrane 11 (a region where the water-repellent layers and the gas diffusion layers are not disposed), a seal member (not shown) is provided.

The cathode-side water-repellent layer 14, the anode-side water-repellent layer 15, the cathode gas diffusion layer 16, and the anode gas diffusion layer 17 are formed of a member having gas permeability and electron conductivity, for example, a porous carbon member such as carbon cloth or carbon paper. The porous carbon member of the cathode-side water-repellent layer 14 and the anode-side water-repellent layer 15 has a smaller pore size than that of the cathode gas diffusion layer 16 and the anode gas diffusion layer 17. For example, the pore size of the cathode-side water-repellent layer 14 and the anode-side water-repellent layer 15 is about 0.5 µm, and the pore size of the cathode gas diffusion layer 16 and the anode gas diffusion layer 17 is about 20 µm. In this way, the pore size of the cathode-side water-repellent layer 14 and the anode-side water-repellent layer 15 is small. Therefore, the outflow of water from the cathode catalyst layer 12 and the anode catalyst layer 13 can be inhibited, and an appropriate amount of water in the membrane electrode assembly 10 can be maintained.

The cathode-side separator 18 and the anode-side separator 19 are formed of a member having gas barrier properties and electron conductivity, for example, a gas-impermeable carbon member such as dense carbon obtained by compressing carbon, or a metal member such as stainless steel obtained by press forming. The cathode-side separator 18 and the anode-side separator 19 have convex-concave portions on surfaces thereof to form a passage for circulating gas. Due to the cathode-side separator 18, a cathode gas passage 20 in which air can be circulated is formed between the cathode-side separator 18 and the cathode gas diffusion layer 16. Due to the anode-side separator 19, an anode gas passage 21 in which hydrogen can be circulated is formed between the anode-side separator 19 and the anode gas diffusion layer 17. In the first embodiment, the anode and the cathode include the diffusion layers, respectively, but the disclosure is not limited thereto. Either one of the anode or the cathode may include the diffusion layer. In this case, gas is directly supplied from the anode gas passage or the cathode gas passage to the catalyst layer through the water-repellent layer. In a configuration in which the diffusion layer is not provided, the water-repellent layer is formed of a seal member having a water-repellent function, a gas permeating function, and a conducting function.

Figure 2:
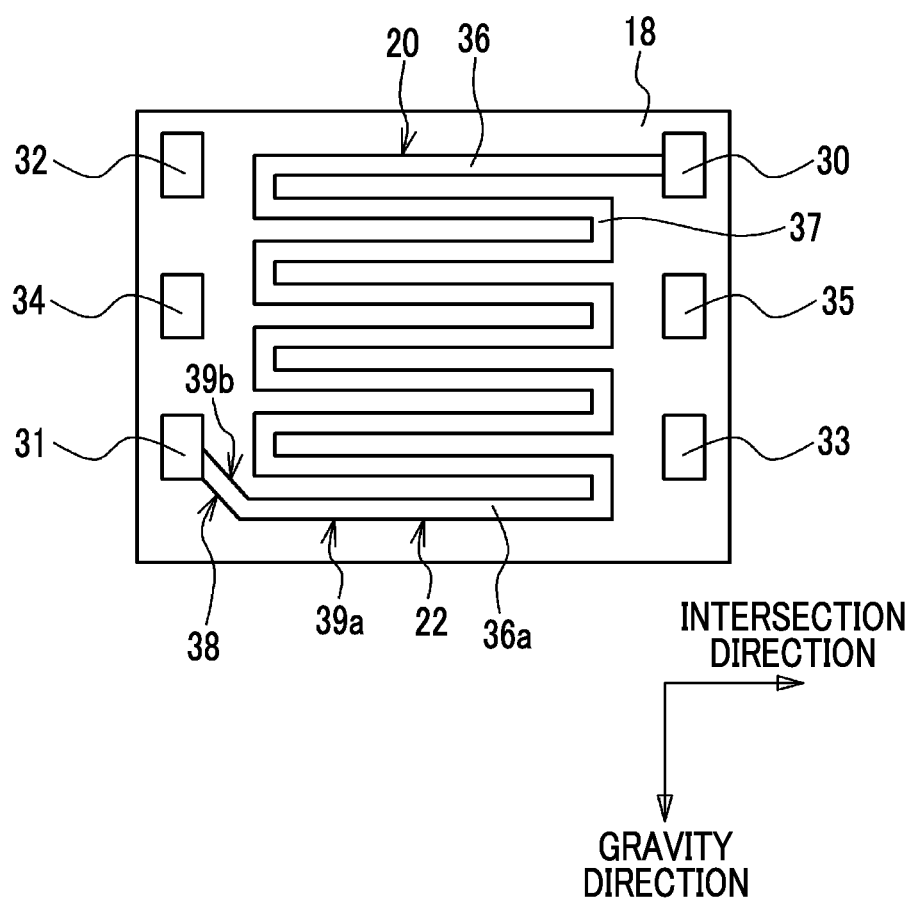
FIG. 2 is a plan view showing a cathode-side separator when seen from a cathode gas diffusion layer side.

Here, the structure of the cathode-side separator 18 will be described in more detail. FIG. 2 is a plan view showing the cathode-side separator 18 when seen from the cathode gas diffusion layer 16 side. As shown in FIG. 2, the cathode-side separator 18 includes an air supply manifold 30, an air exhaust manifold 31, a hydrogen supply manifold 32, a hydrogen exhaust manifold 33, a coolant supply manifold 34, and a coolant exhaust manifold 35.

Each of the manifolds is a through-hole in a thickness direction of the cathode-side separator 18. The air supply manifold 30 forms a passage for circulating air supplied from the outside of the fuel cell in a stacking direction of the fuel cell. The air exhaust manifold 31 forms a passage for circulating cathode off gas exhausted from the membrane electrode assembly 10 in the stacking direction of the fuel cell to be exhausted to the outside of the fuel cell. The hydrogen supply manifold 32 forms a passage for circulating hydrogen supplied from the outside of the fuel cell in the stacking direction of the fuel cell. The hydrogen exhaust manifold 33 forms a passage for circulating anode off gas exhausted from the membrane electrode assembly 10 in the stacking direction of the fuel cell to be exhausted to the outside of the fuel cell. The coolant supply manifold 34 forms a passage for circulating a coolant supplied from the outside of the fuel cell in the stacking direction of the fuel cell. The coolant exhaust manifold 35 forms a passage for circulating the coolant, which has been circulated in a power generation portion, in the stacking direction of the fuel cell to be exhausted to the outside of the fuel cell.

The cathode gas passage 20 is formed of a serpentine-shaped groove. That is, the cathode gas passage 20 is formed of: plural first groove portions 36 that extend in an intersection direction intersecting the gravity direction in a state where the fuel cell is mounted on something; and plural second groove portions 37 that connect the first groove portions 36 to each other and extend in the gravity direction. A first groove portion 36a, which is positioned on the lowermost side in the gravity direction among the plural first groove portions 36, has: a first portion 39a that extends in the intersection direction intersecting the gravity direction; and a second portion 39b that extends upward from the first portion 39a and is connected to the air exhaust manifold. The second portion 39b of the first groove portion 36a extends upward and thus functions as a water exhaust inhibiting portion 38 that inhibits liquid water from being exhausted to the air exhaust manifold 31. In the first portion 39a of the first groove portion 36a, liquid water is not likely to flow to the air exhaust manifold 31 by the water exhaust inhibiting portion 38. Therefore, the first portion 39a functions as a water storage portion 22 in which dew condensation water produced by the fuel cell being stopped is stored.

As shown in FIGS. 1B and 1C, in the cathode-side water-repellent layer 14, a liquid water connection portion 24 through which liquid water flows between the cathode catalyst layer 12 and the water storage portion 22 is provided, the liquid water connection portion 24 being a through-hole which passes through the cathode-side water-repellent layer 14 from the cathode catalyst layer 12 side to the cathode gas diffusion layer 16 side. The liquid water connection portion 24 is provided so as to be positioned at the same height as that of the first groove portion 36a. A section of the liquid water connection portion 24 has, for example, a circular shape having a diameter of about 0.5 mm. The sectional shape of the liquid water connection portion 24 is not limited to a circular shape and may be a rectangular shape, an elliptical shape, or other shapes.

Figure 3A:
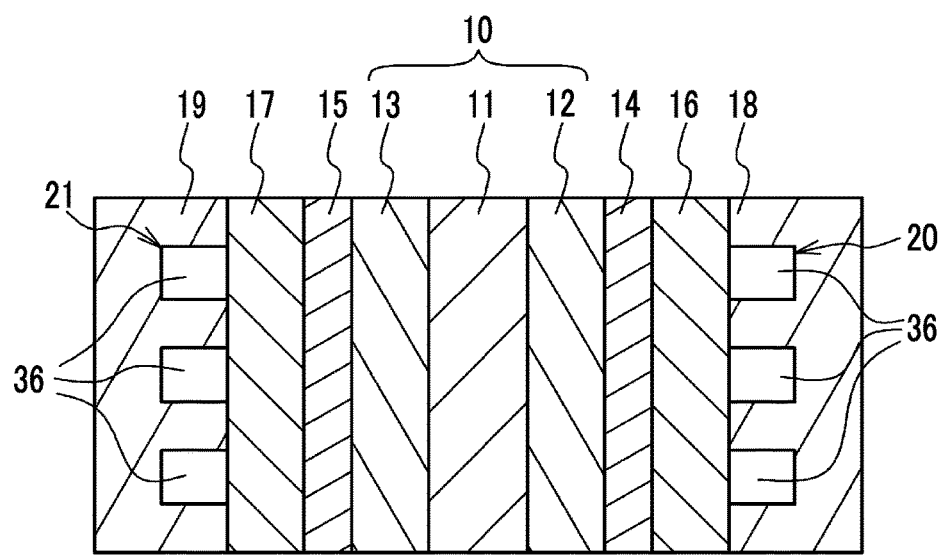
FIG. 3A is a sectional view showing a single cell of a fuel cell according to Comparative Example.
Figure 3B:
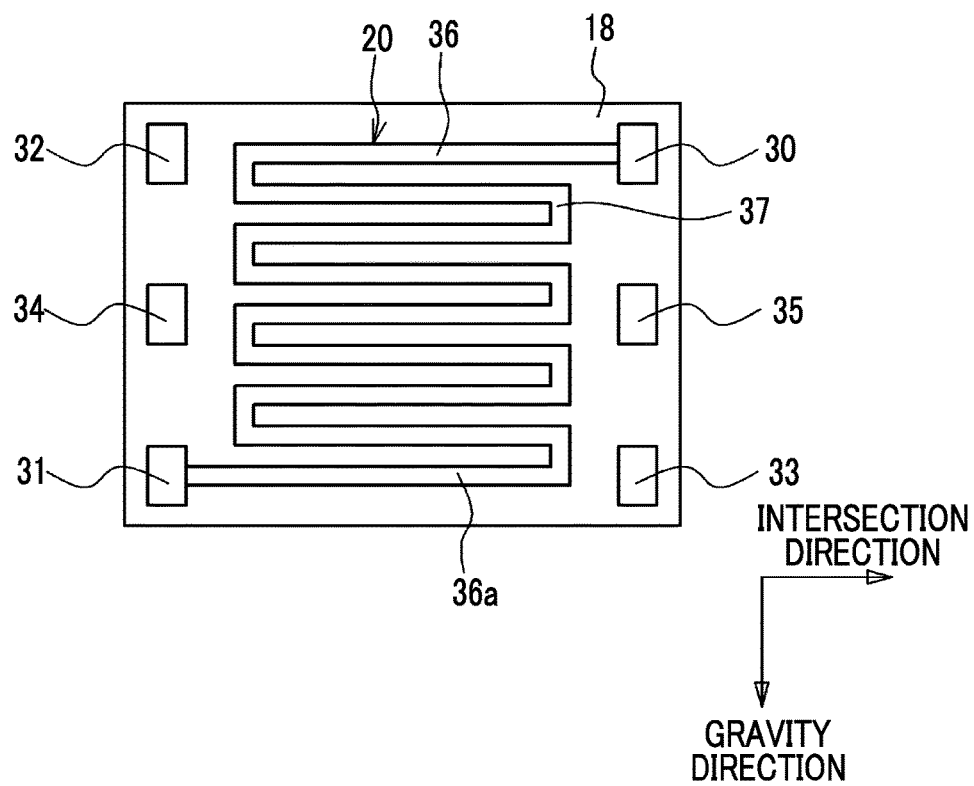
FIG. 3B is a plan view showing a cathode-side separator when seen from a cathode gas diffusion layer side.

Here, in order to describe the effect of the fuel cell according to the first embodiment, a fuel cell according to Comparative Example will be described. FIG. 3A is a sectional view showing a single cell of the fuel cell according to Comparative Example. FIG. 3B is a plan view showing the cathode-side separator 18 when seen from the cathode gas diffusion layer 16 side; As shown in FIG. 3A, the liquid water connection portion 24 which passes through the cathode-side water-repellent layer 14 is not provided. As shown in FIG. 3B, the first groove portion 36a is linearly connected to the air exhaust manifold 31 in the intersection direction, and water exhaust inhibiting portion 38 and the water storage portion 22 are not formed. Since the other configurations are the same as those of the first embodiment, the description thereof will not be repeated.

Figure 4:
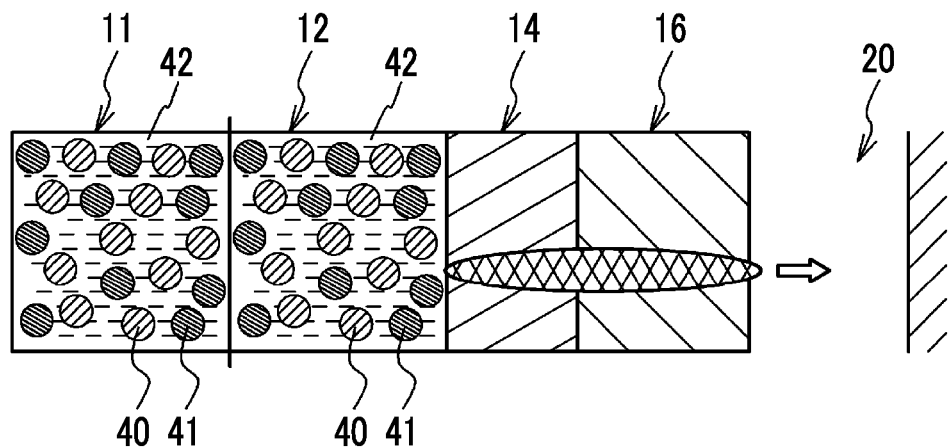
FIG. 4 is a diagram showing a mechanism in which cationic impurities included in liquid water in the fuel cell according to Comparative Example are not likely to be exhausted to the outside of the fuel cell.

FIG. 4 is a diagram showing a mechanism in which cationic impurities 40 included in liquid water in the fuel cell according to Comparative Example are not likely to be exhausted to the outside of the fuel cell. As shown in FIG. 4, water (liquid water 42) is produced due to an electrochemical reaction in the cathode catalyst layer 12. In a case where the fuel cell operates for a long period of time, the cationic impurities 40 included in in-take air or materials constituting the electrolyte membrane and the electrode catalyst layer are incorporated into the liquid water 42 together with protons 41. In a case where the cationic impurities 40 are incorporated into the liquid water 42, the power generation performance deteriorates. Examples of the cationic impurities 40 include $Ca^{2+}$, $Mg^{2+}$, and $Co^{2+}$.

The cationic impurities 40 in the liquid water 42 are diffused in the liquid water 42 by concentration diffusion. The diffused amount can be expressed by Expression 1, the final ratio of the cationic impurities 40 is the same in the electrolyte membrane 11 and the cathode catalyst layer 12.

$$\frac{\text{Protons in Electrolyte Membrane}}{\text{Cationic Impurities in Electrolyte Membrane}} = \frac{\text{Protons in Cathode Catalyst Layer}}{\text{Cationic Impurities in Cathode Catalst Layer}}$$

Since the cathode-side water-repellent layer 14 is provided on a side surface of the cathode catalyst layer 12, the liquid water 42 is not likely to be exhausted from the cathode catalyst layer 12 to the outside. However, a portion of the liquid water 42 dissolved in the cathode off gas permeates through the cathode-side water-repellent layer 14 and thus is exhausted to the outside. On the other hand, the cationic impurities 40 cannot be dissolved in the cathode off gas. Therefore, unlike the liquid water 42, the cationic impurities cannot be exhausted to the outside by being dissolved in the cathode off gas. Due to the above-described reason, the cationic impurities 40 in the liquid water 42 are not likely to be exhausted to the outside of the fuel cell.

Figure 5A:
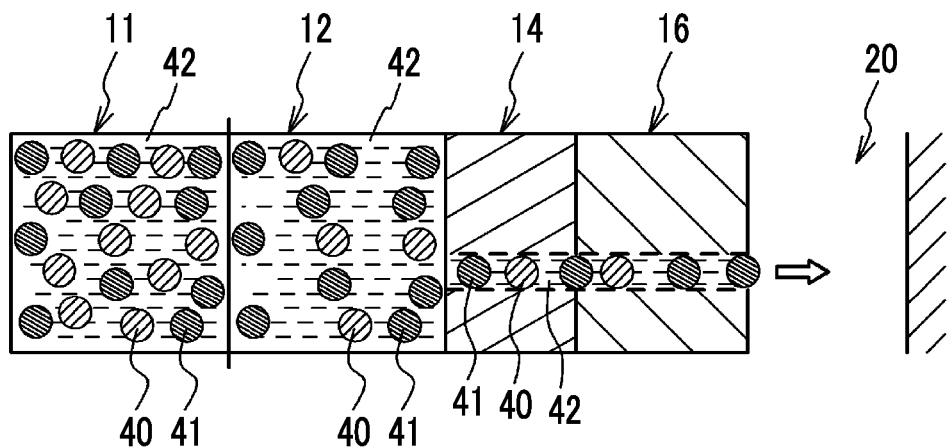
FIG. 5A is a diagram showing a mechanism in which cationic impurities are exhausted to the outside of the fuel cell according to Comparative Example by operating the fuel cell at a high load.
Figure 5B:
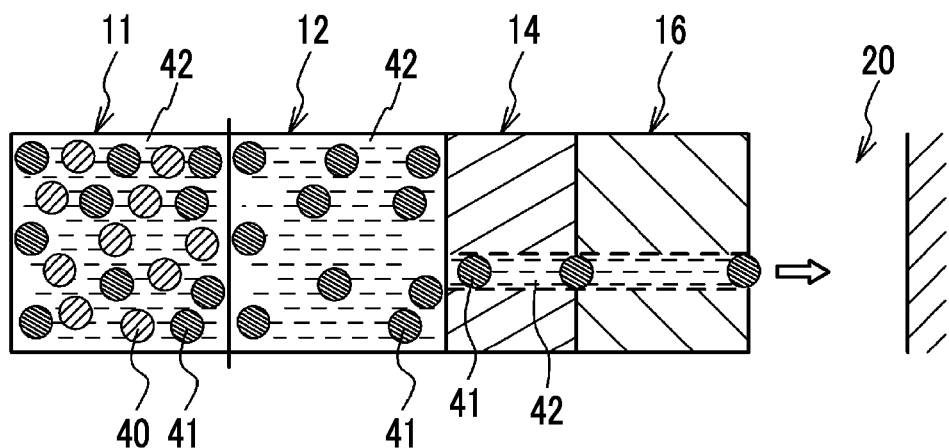
FIG. 5B is a diagram showing the mechanism in which cationic impurities are exhausted to the outside of the fuel cell according to Comparative Example by operating the fuel cell at a high load.

According to JP 2001-85037 A, cationic impurities are exhausted to the outside of a fuel cell by operating the fuel cell at a high load. This method will be described using FIGS. 5A and 5B. FIGS. 5A and 5B are diagrams showing a mechanism in which cationic impurities are exhausted to the outside of the fuel cell according to Comparative Example by operating the fuel cell at a high load.

As shown in FIG. 5A, by operating the fuel cell at a high load, a large amount of water (liquid water 42) is produced. Therefore, an amount of the liquid water 42, which is more than the amount in which the liquid water 42 can be dissolved in the cathode off gas and can be exhausted to the outside, increases the pressure of the liquid water 42 in the cathode catalyst layer 12. As a result, the liquid water 42 in the cathode catalyst layer 12 passes through the cathode-side water-repellent layer 14 and is exhausted to the cathode gas passage 20. When the liquid water 42 is exhausted, the cationic impurities 40 in the liquid water 42 are exhausted together.

However, the amount of the liquid water 42 which passes through the cathode-side water-repellent layer 14 and is exhausted to the cathode gas passage 20 is not large. In addition, the cationic impurities 40 are diffused in the liquid water 42 by concentration diffusion. Therefore, the moving speed is slow, and a long period of time is required to obtain the above-described state of Expression 1. That is, the cationic impurities 40 cannot move to the liquid water 42, which is produced by operating the fuel cell at a high load, within a short period of time. Therefore, only a portion of the cationic impurities 40, which has been diffused in the liquid water 42 present near the cathode-side water-repellent layer 14 in the cathode catalyst layer 12 before the operation of the fuel cell at a high load, is exhausted together with the liquid water 42 by operating the fuel cell at a high load. As shown in FIG. 5B, the cationic impurities 40 included in the liquid water 42 of the electrolyte membrane 11 are not likely to be exhausted. Accordingly, a large amount of the cationic impurities 40 are not likely to be exhausted to the outside of the fuel.

Figure 6:
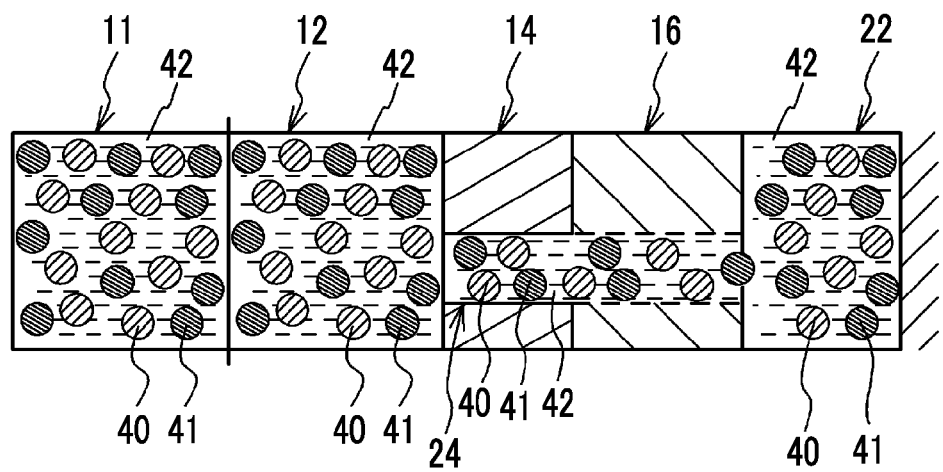
FIG. 6 is a diagram showing an effect of the fuel cell according to the first embodiment.

FIG. 6 is a diagram showing the effect of the fuel cell according to the first embodiment. As shown in FIG. 6, the cathode gas passage 20 has the water storage portion 22 shown in FIG. 2. As described above, in the water storage portion 22, the liquid water 42 such as dew condensation water which is produced by the fuel cell being stopped is not likely to flow to the air exhaust manifold 31, and thus a large amount of the liquid water 42 can be stored. In addition, in the cathode-side water-repellent layer 14, the liquid water connection portion 24 which is the through-hole is provided. Therefore, the liquid water 42 in the cathode catalyst layer 12, the electrolyte membrane 11, and the anode catalyst layer 13 is connected to the liquid water 42 stored in the water storage portion 22 through the liquid water connection portion 24. As a result, the cationic impurities 40 can move between the liquid water 42 of the cathode catalyst layer 12 and the liquid water 42 stored in the water storage portion 22. Since it is assumed that the stoppage time of the fuel cell is long to some extent, it is assumed that a large amount of the cationic impurities 40 are diffused in a large amount of the liquid water 42 stored in the water storage portion 22 such that the concentration of the cationic impurities 40 in the liquid water 42 of the water storage portion 22 increases. Therefore, by causing an amount of gas, which is required to generate power during the activation of the fuel cell, to flow, the liquid water 42 stored in the water storage portion 22 can be exhausted and a large amount of the cationic impurities 40 can be exhausted to the outside of the fuel cell.

As described above, according to the first embodiment, as shown in FIG. 2, the cathode gas passage 20 includes the water exhaust inhibiting portion 38 and the water storage portion 22, the water exhaust inhibiting portion 38 is provided in the lowermost passage positioned on the lowermost side in the gravity direction in order to inhibit liquid water from being exhausted to the air exhaust manifold 31, and the water storage portion 22 is provided upstream of the water exhaust inhibiting portion 38 such that liquid water 42 is stored in the water storage portion 22 by the water exhaust inhibiting portion 38. As shown in FIG. 1B, in the cathode-side water-repellent layer 14, the liquid water connection portion 24 through which the liquid water 42 flows between the cathode catalyst layer 12 and the water storage portion 22 is provided. As a result, due to the mechanism shown in FIG. 6, a large amount of the cationic impurities 40 can be exhausted to the outside of the fuel cell, and the power generation performance can be restored satisfactorily. The dew condensation water produced by the fuel cell being stopped moves downward due to gravity, for example, along the cathode gas diffusion layer 16. Therefore, by providing the water storage portion 22 in the lowermost passage in the cathode gas passage 20 which is positioned on the lowermost side in the gravity direction, a large amount of dew condensation water (liquid water 42) can be stored in the water storage portion 22.

Figure 7:
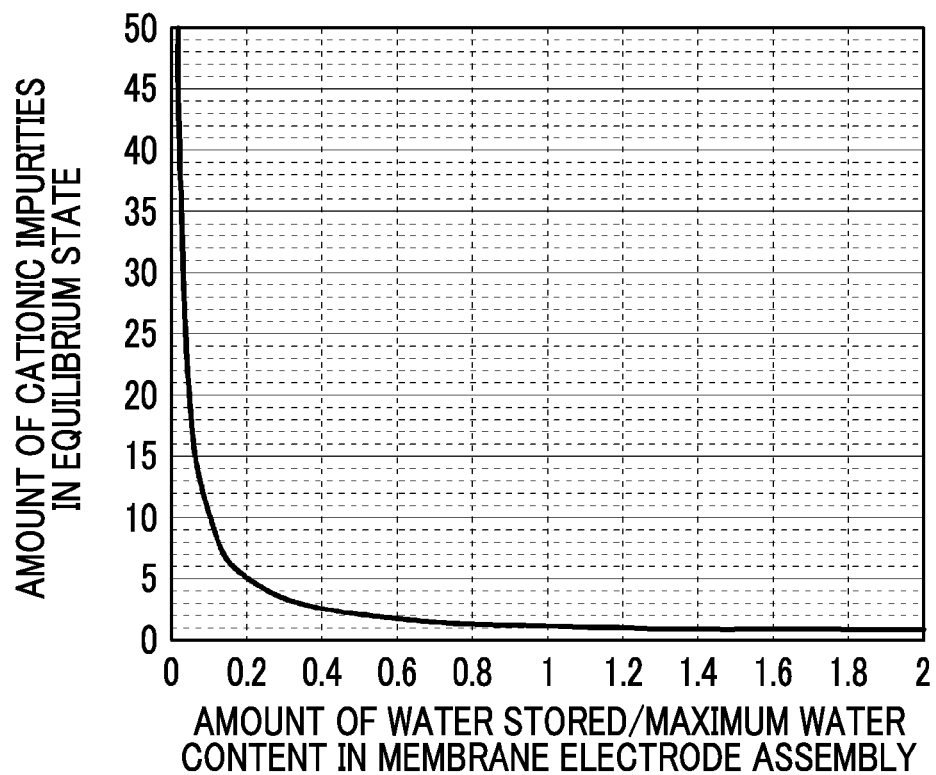
FIG. 7 is a diagram showing the amount of cationic impurities in which the amount of water stored in a water storage portion is finally in an equilibrium state between a membrane electrode assembly and the water storage portion.

In the first embodiment, it is preferable that the volume of the water storage portion 22 is 20% or higher of the maximum water content of the membrane electrode assembly 10. This configuration will be described using FIG. 7. FIG. 7 is a diagram showing the amount of the cationic impurities 40 in which the amount of water stored in the water storage portion 22 is finally in an equilibrium state between the membrane electrode assembly 10 and the water storage portion 22. In FIG. 7, the amount of the cationic impurities 40 incorporated per predetermined traveling distance (for example, 1000 km) is represented by 1. In FIG. 7, the horizontal axis represents a ratio (amount of water stored/maximum water content of membrane electrode assembly) of the amount of water stored in the water storage portion 22 to the maximum water content of the membrane electrode assembly 10. The vertical axis represents the amount of the cationic impurities 40 in which, by repeatedly exhausting the liquid water 42 stored in the water storage portion 22 to the outside of the fuel cell, the amount of water stored in the water storage portion 22 is finally in an equilibrium state between the membrane electrode assembly 10 and the water storage portion 22.

As shown in FIG. 7, in a case where (amount of water stored/maximum water content of membrane electrode assembly) is 1, the amount of the cationic impurities 40 accumulating in the membrane electrode assembly 10 is suppressed to about the amount of the cationic impurities 40 incorporated per predetermined traveling distance. Even in a case where (amount of water stored/maximum water content of membrane electrode assembly) is higher than 1, the amount of the cationic impurities 40 accumulating in the membrane electrode assembly 10 is not reduced that much. On the other hand, in a case where (amount of water stored/maximum water content of membrane electrode assembly) is lower than 0.2, the amount of the cationic impurities 40 accumulating in the membrane electrode assembly 10 is rapidly increased.

Based on the above results, from the viewpoint of reducing the amount of the cationic impurities 40 accumulating in the membrane electrode assembly 10, it is preferable that the volume of the water storage portion 22 is 20% or higher of the maximum water content of the membrane electrode assembly 10. The volume of the water storage portion 22 is more preferably 50% or higher and still more preferably 80% or higher of the maximum water content of the membrane electrode assembly 10. On the other hand, even in a case where the volume of the water storage portion 22 is higher than 100% of the maximum water content of the membrane electrode assembly 10, the amount of the cationic impurities 40 accumulating in the membrane electrode assembly 10 does not change substantially. As the volume of the water storage portion 22 increases, the size of the fuel cell may increase. The volume of the water storage portion 22 is preferably 200% or lower, more preferably 160% or lower, and still more preferably 140% or lower of the maximum water content of the membrane electrode assembly 10.

The water content in the membrane electrode assembly 10 is determined substantially based on the water content in the electrolyte membrane of the membrane electrode assembly 10 and the water content in the pores of the cathode catalyst layer 12. The maximum water content of the electrolyte membrane is a value which is determined based on the structure of the electrolyte membrane, and can be obtained from the following Expression 2.

$$\lambda \left( V_{mem} \frac{\rho_{mem}}{EW_{mem}} + \sum_{i=An,Ca} V_{ion,i} \frac{\rho_{ion,i}}{EW_{ion,i}} \right) = V_W \frac{\rho_W}{M_W}$$

λ represents a water content coefficient of $SO_3^-$ in the electrolyte membrane. $V_{mem}$, $\rho_{mem}$, and $EW_{mem}$ represent values of the volume, density, and equivalent weight (EW) of the electrolyte membrane 11, respectively. $V_{ion, An}$, $\rho_{ion, An}$, and $EW_{ion, An}$ represent values of the volume, density, and EW of the ionomer of the anode catalyst layer 13. $V_{ion, Ca}$, $\rho_{ion, Ca}$, and $EW_{ion, Ca}$ represent values of the volume, density, and EW of the ionomer of the cathode catalyst layer 12. $V_W$ represents the volume of water stored. $\rho_W$ and $M_W$ represents the density and molecular weight of water.

The pore volume of the cathode catalyst layer 12 is a value which is determined based on the structure of the cathode catalyst layer 12, and can be obtained from the following Expression 3. Since the pores contain water, the water content can be obtained by obtaining the pore volume. The pore volume can be calculated based on the volume (area and thickness) and the porosity of the cathode catalyst layer 12. The porosity is a ratio of the pore volume, which is obtained by subtracting the total volume of materials included in the cathode catalyst layer 12 (the carbon support, the ionomer, and the catalyst) from the volume of the cathode catalyst layer 12, to the volume of the cathode catalyst layer 12.

$$\text{Pore Volume} = \varepsilon S_{CL} = S_{CL} - \frac{m_c}{\rho_c} - \frac{m_{ion}}{\rho_{ion}} - \frac{m_{Pt}}{\rho_{Pt}}$$

$\varepsilon$ represents the porosity, and $S_{CL}$ represents the volume of the cathode catalyst layer 12. $m_c$ and $\rho_c$ represent the mass and density of the carbon support included in the cathode catalyst layer 12. $m_{ion}$ and $\rho_{ion}$ represent the mass and density of the ionomer included in the cathode catalyst layer 12. $m_{pt}$ and $\rho_{pt}$ represent the mass and density of the catalyst included in the cathode catalyst layer 12.

For example, the maximum water content per 1 cm² is 1.08 mg/cm² when obtained using the following representative physical properties.

λ: 14
$V_{mem}$: 0.001 cm³
$\rho_{mem}$: 2 g/m³
$EW_{mem}$: 1000 g/mol
$V_{ion, An}$: 7.5×10⁻⁵ cm³
$\rho_{ion, An}$: 2 g/cm³
$EW_{ion, An}$: 1000 g/mol
$V_{ion, Ca}$: 1.5×10⁻⁴ cm³
$\rho_{ion, Ca}$: 2 g/cm³
$EW_{ion, Ca}$: 1000 g/mol
$V_W$: calculated value
ρw: 1 g/cm³
$M_W$: 18 g/mol
ε: 0.45
$S_{CL}$: 0.001 cm³

In a single cell having a power generation area of 200 cm², the maximum water content of each single cell is 0.216 g. In this case, it is preferable that the volume of the water storage portion 22 of each single cell is 20% or higher of the maximum water content and is 0.043 cc or higher. For example, the volume of a groove portion having a length of 200 mm, a width of 0.5 mm, and a depth of 0.5 mm is 0.05 cc. Therefore, by forming the water storage portion 22 using the groove portion having the above-described size, the water storage portion 22 can function in the cell having the above-described representative physical properties.

In the first embodiment, from the viewpoint of promoting the connection between the liquid water 42 of the cathode catalyst layer 12 and the liquid water 42 stored in the water storage portion 22, it is preferable that at least a portion of the cathode gas diffusion layer 16 opposite to the liquid water connection portion 24 is highly hydrophilic. In a case where the cathode gas diffusion layer 16 is formed of a porous carbon member, a hydrophilic carbon can be obtained, for example, by bonding a hydrophilic functional group such as a carboxyl group or a hydroxyl group to carbon.

Figure 8:
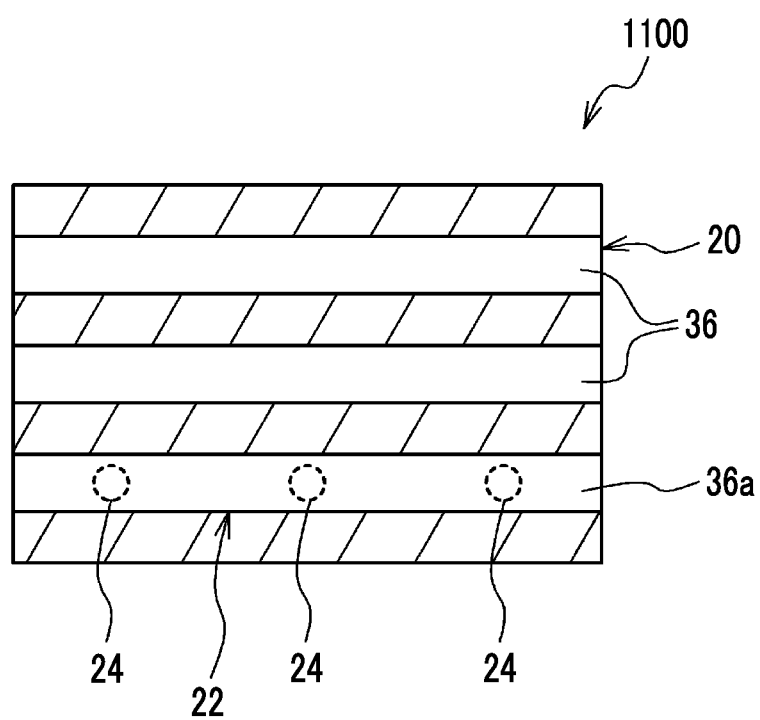
FIG. 8 is a sectional view showing a single cell of a fuel cell according to a first modification example of the first embodiment.

In the first embodiment, the example in which one liquid water connection portion 24 is provided in the cathode-side water-repellent layer 14 has been described, but the disclosure is not limited thereto. FIG. 8 is a sectional view showing a single cell 1100 of a fuel cell according to a first modification example of the first embodiment. FIG. 8 shows a portion corresponding to FIG. 1C. As shown in FIG. 8, plural liquid water connection portions 24 may be provided.

Figure 9A:
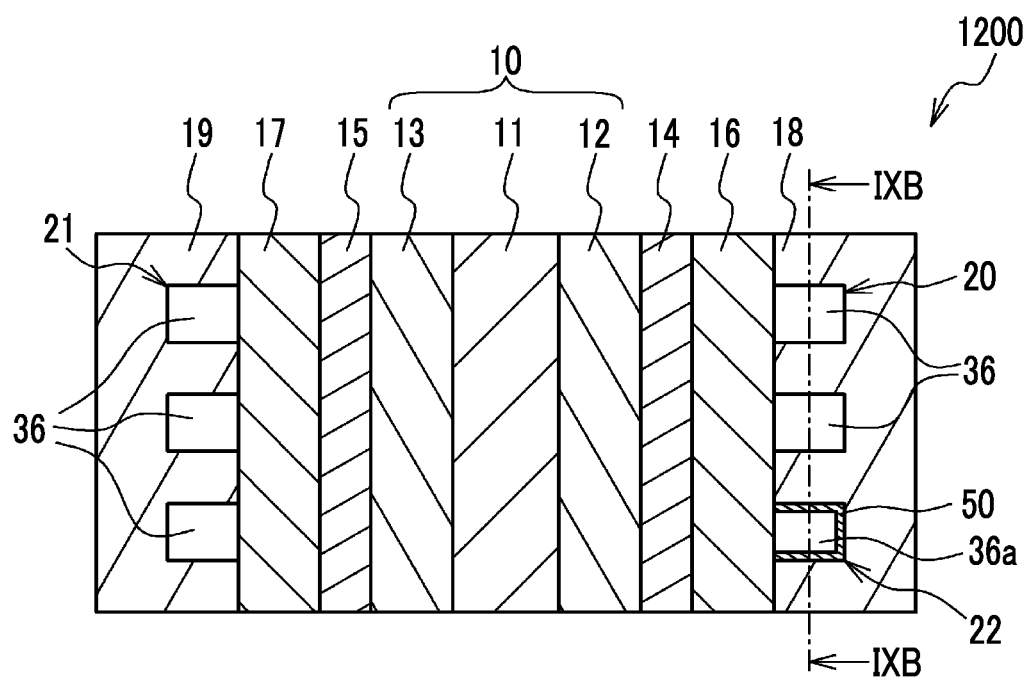
FIG. 9A is a sectional view showing a single cell of a fuel cell according to a second modification example of the first embodiment.
Figure 9B:
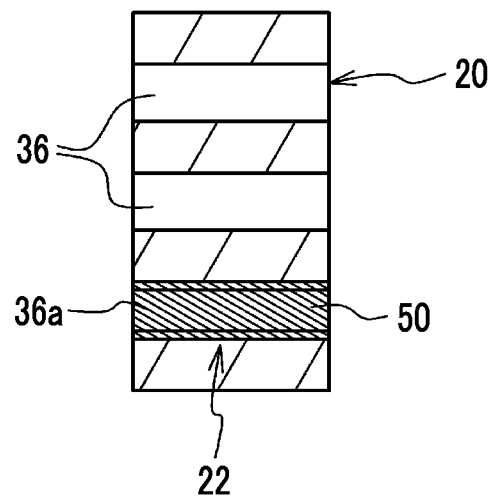
FIG. 9B is a sectional view taken along line IXB-IXB of FIG. 9A.
Figure 10:
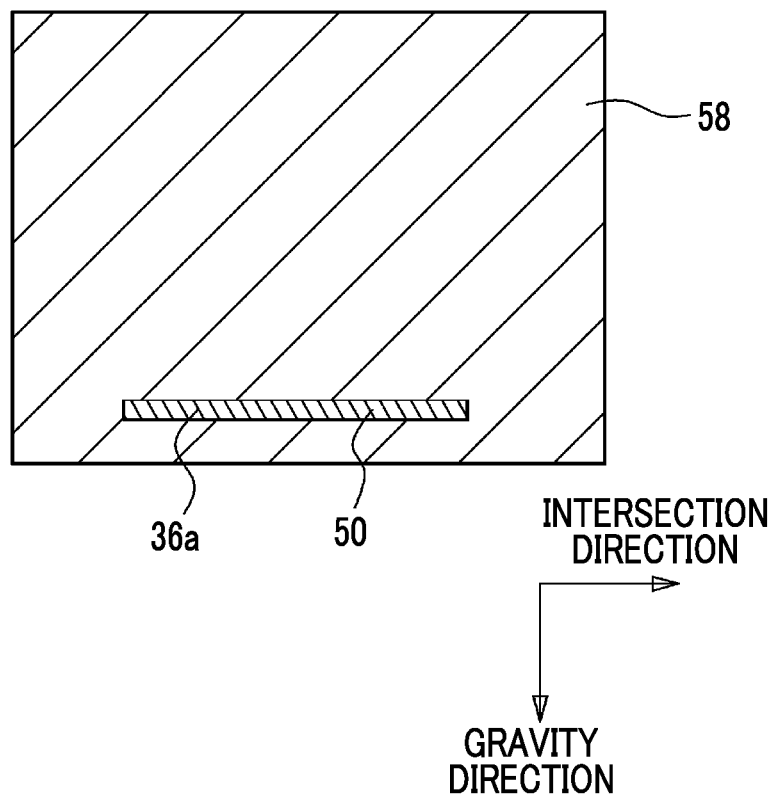
FIG. 10 is a diagram showing a method of forming a hydrophilic film.

FIG. 9A is a sectional view showing a single cell 1200 of a fuel cell according to a second modification example of the first embodiment. FIG. 9B is a sectional view taken along line IXB-IXB of FIG. 9A. As shown in FIGS. 9A and 9B, in the single cell 1200, a hydrophilic film 50 is provided on a wall surface of the first groove portion 36a which forms the water storage portion 22. As shown in FIG. 10, the hydrophilic film 50 can be obtained by masking portions of the cathode-side separator 18 excluding the first groove portion 36a with a mask 58 and forming an oxide film formed of $SiO_2$, $SnO_2$, $TiO_2$ or the like or a polymer film such as cellulose on the first groove portion 36a. In a case where a surface portion of the cathode-side separator 18 includes carbon, the hydrophilic film 50 can be formed by performing a surface treatment such as an oxidation treatment or a plasma treatment on the surface of the first groove portion 36a such that a hydrophilic functional group such as a carboxyl group or a hydroxyl group is bonded to the carbon. Since the other configurations are the same as those of the first embodiment, the description thereof will not be repeated.

As in the second modification example of the first embodiment, the hydrophilic film 50 may be provided on the wall surface of the first groove portion 36a which forms the water storage portion 22. As a result, even on the upper wall surface of the water storage portion 22, the liquid water 42 can be easily stored in the form of a film.

Figure 11:
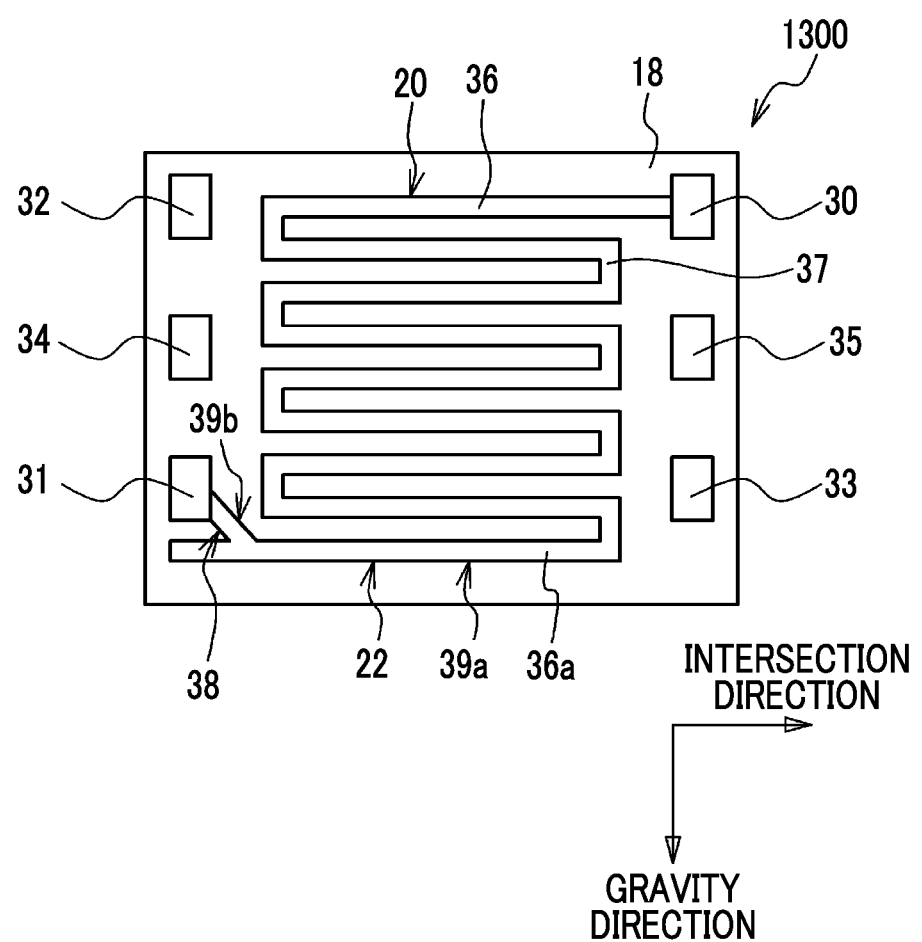
FIG. 11 is a plan view showing a cathode-side separator, which is included in a single cell of a fuel cell according to a third modification example of the first embodiment, when seen from a cathode gas diffusion layer side.

FIG. 11 is a plan view showing the cathode-side separator 18, which is included in a single cell 1300 of a fuel cell according to a third modification example of the first embodiment, when seen from the cathode gas diffusion layer 16 side. As shown in FIG. 11, in the single cell 1300, the first portion 39a of the first groove portion 36a extends to a region immediately below the air exhaust manifold 31. Since the other configurations are the same as those of the first embodiment, the description thereof will not be repeated.

As in the third modification example of the first embodiment, by the first portion 39a of the first groove portion 36a extending to the region immediately below the air exhaust manifold 31, the volume of the water storage portion 22 can be increased while preventing an increase in the size of the fuel cell.

Figure 12A:
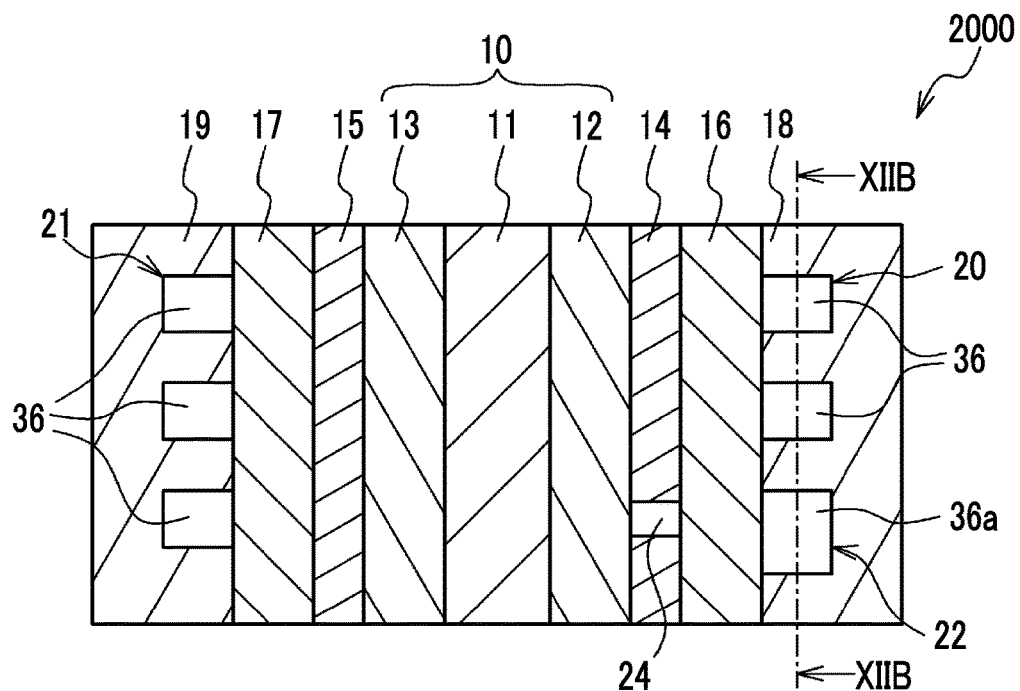
FIG. 12A is a sectional view showing a configuration of a single cell of a fuel cell according to a second embodiment.
Figure 12B:
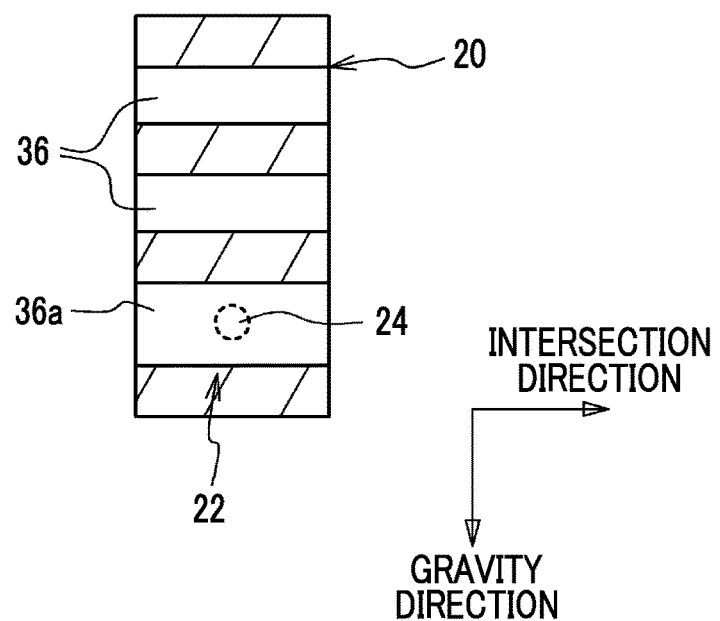
FIG. 12B is a sectional view taken along line XIIB-XIIB of FIG. 12A.

FIG. 12A is a sectional view showing a configuration of a single cell 2000 of a fuel cell according to a second embodiment. FIG. 12B is a sectional view taken along line XIIB-XIIB of FIG. 12A. As shown in FIGS. 12A and 12B, in the single cell 2000, the first groove portion 36a in which the water storage portion 22 is formed has a longer length in the gravity direction and a larger sectional area than the other first groove portions 36. Since the other configurations are the same as those of the first embodiment, the description thereof will not be repeated.

According to the second embodiment, the sectional area of the first groove portion 36a in which the water storage portion 22 is formed is larger than those of the other first groove portions 36. There may be a case where the liquid water 42 such as water produced during the power generation of the fuel cell is stored in the water storage portion 22 such that the supply of air is insufficient. In this case, by increasing the sectional area of the first groove portion 36a in which the water storage portion 22 is formed, the insufficient supply of air can be suppressed.

Figure 13A:
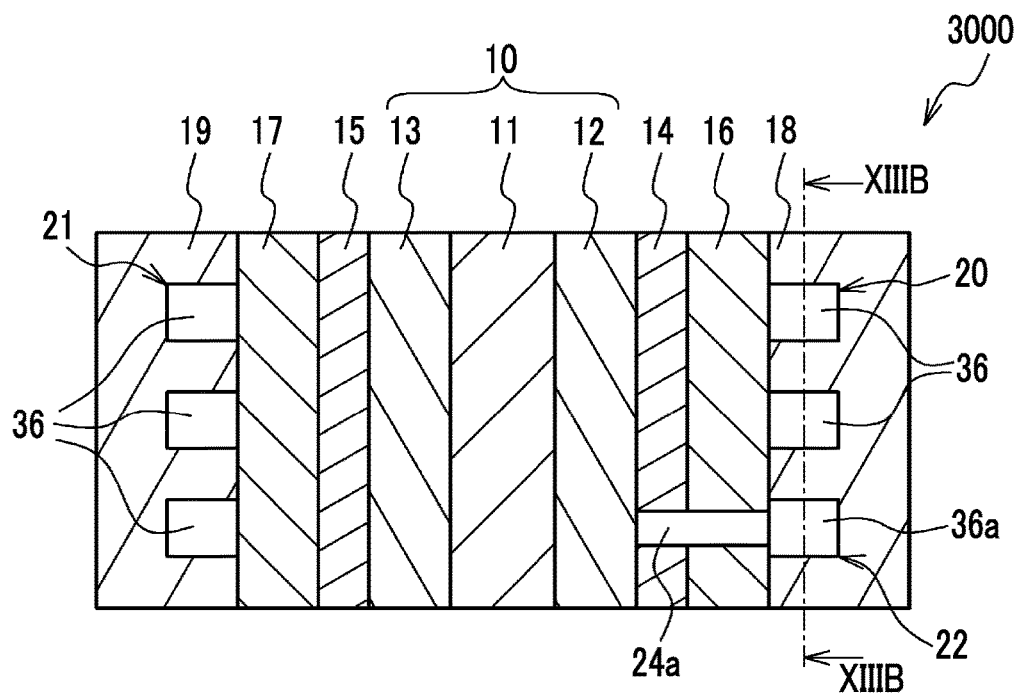
FIG. 13A is a sectional view showing a configuration of a single cell of a fuel cell according to a third embodiment.
Figure 13B:
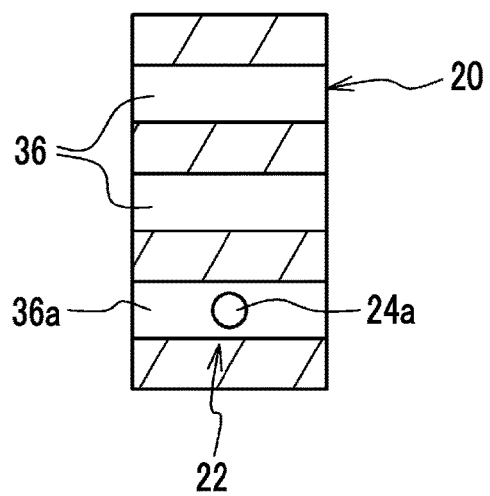
FIG. 13B is a sectional view taken along line XIIIB-XIIIB of FIG. 13A.

FIG. 13A is a sectional view showing a configuration of a single cell 3000 of a fuel cell according to a third embodiment. FIG. 13B is a sectional view taken along line XIIIB-XIIIB of FIG. 13A. As shown in FIGS. 13A and 13B, in the single cell 3000, a liquid water connection portion 24a is provided so as to pass through the cathode-side water-repellent layer 14 and the cathode gas diffusion layer 16 from the cathode catalyst layer 12 side to the cathode-side separator 18 side. The liquid water connection portion 24a is in contact with the water storage portion 22. Since the other configurations are the same as those of the first embodiment, the description thereof will not be repeated.

According to the third embodiment, the liquid water connection portion 24a is provided to pass through the cathode-side water-repellent layer 14 and the cathode gas diffusion layer 16, and the liquid water connection portion 24a and the water storage portion 22 are in contact with each other. As a result, the liquid water 42 of the cathode catalyst layer 12 and the liquid water 42 stored in the water storage portion 22 are easily connected to each other.

Figure 14A:
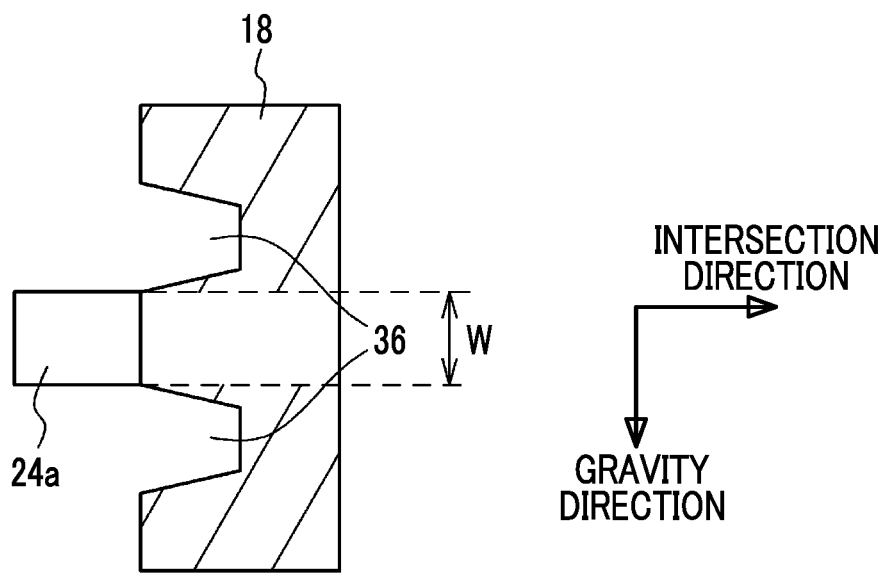
FIG. 14A is a sectional view showing a connection relationship between a liquid water connection portion and a cathode-side separator.
Figure 14B:
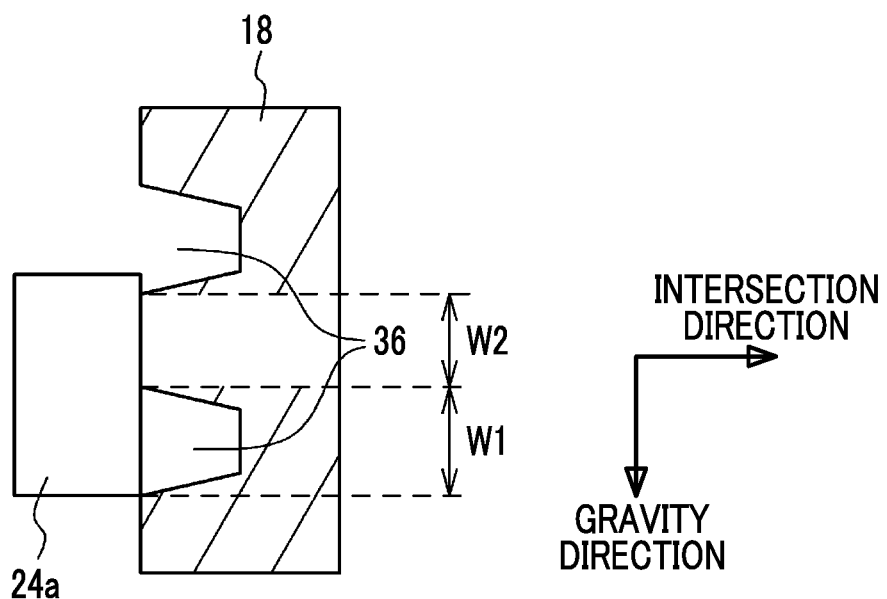
FIG. 14B is a sectional view showing the connection relationship between the liquid water connection portion and the cathode-side separator.

In the third embodiment, it is preferable that a length of the liquid water connection portion 24a in the gravity direction is more than a width between one first groove portion 36 opposite to the liquid water connection portion 24a among the plural first groove portions 36 and another first groove portion 36 adjacent to the first groove portion 36 opposite to the liquid water connection portion 24a. It is preferable that the length of the liquid water connection portion 24a in the gravity direction is equal to or less than the sum of a width of one first groove portion 36 opposite to the liquid water connection portion 24a in the gravity direction and the width between the first groove portion 36 opposite to the liquid water connection portion 24a and another first groove portion adjacent to the first groove portion 36 opposite to the liquid water connection portion 24a. These configurations will be described using FIGS. 14A and 14B. FIGS. 14A and 14B are sectional views showing a connection relationship between the liquid water connection portion 24a and the cathode-side separator 18.

As shown in FIG. 14A, in a case where the length of the liquid water connection portion 24a in the gravity direction is equal to or less than a width W between the first groove portions 36, the liquid water connection portion 24a may not be in contact with the first groove portion 36 due to manufacturing errors or the like. Therefore, it is preferable that the length of the liquid water connection portion 24a in the gravity direction is more than the width between one first groove portion 36 opposite to the liquid water connection portion 24a and another first groove portion 36 adjacent to the first groove portion 36 opposite to the liquid water connection portion 24a.

As shown in FIG. 14B, in a case where the length of the liquid water connection portion 24a in the gravity direction is more than the sum of a width W1 of the first groove portion 36 in the gravity direction and a width W2 between the first groove portions 36, the liquid water connection portion 24a may be in contact with two or more first groove portions 36. In order to diffuse the cationic impurities 40 from the cathode catalyst layer 12 to the water storage portion 22, it is sufficient that the liquid water connection portion 24a is in contact with one first groove portion 36. In a case where the liquid water connection portion 24a is in contact with two or more first groove portions 36, the area of a region where the liquid water connection portion 24a is provided increases, which may lead to a deterioration in the function of the cathode-side water-repellent layer 14. It is preferable that the length of the liquid water connection portion 24a in the gravity direction is equal to or less than the sum of the width of the first groove portion 36 opposite to the liquid water connection portion 24a in the gravity direction and the width between one first groove portion 36 opposite to the liquid water connection portion 24a and another first groove portion adjacent to the first groove portion 36 opposite to the liquid water connection portion 24a.

Figure 15:
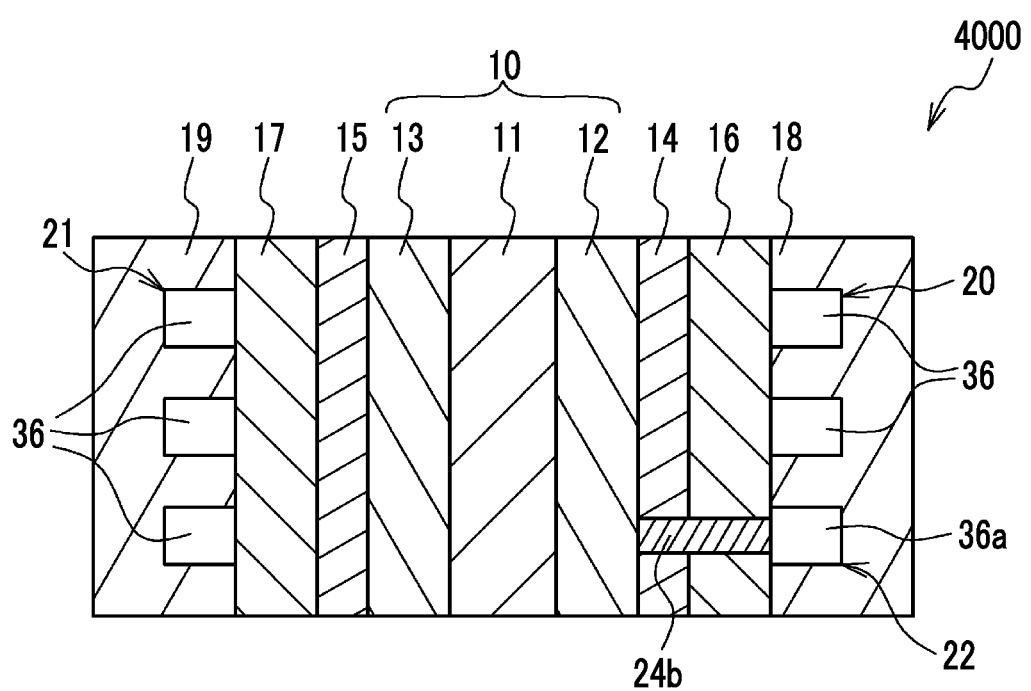
FIG. 15 is a sectional view showing a configuration of a single cell of a fuel cell according to a fourth embodiment.

FIG. 15 is a sectional view showing a configuration of a single cell 4000 of a fuel cell according to a fourth embodiment. As shown in FIG. 15, in the single cell 4000, a liquid water connection portion 24b, which is provided to pass through the cathode-side water-repellent layer 14 and the cathode gas diffusion layer 16, is formed of a hydrophilic member. The liquid water connection portion 24b formed of the hydrophilic member can be formed by embedding a fiber member or a porous member having pores and a surface, on which a hydrophilic treatment is performed, into a through-hole passing through the cathode-side water-repellent layer 14 and the cathode gas diffusion layer 16. In a case where the liquid water connection portion 24b is formed of a conductive material, there is an advantageous effect during power generation. Therefore, it is preferable that the liquid water connection portion 24b is formed of, for example, a carbon material. Examples of a method of making the carbon material hydrophilic include a method of binding a hydrophilic functional group such as a carboxyl group or a hydroxyl group to a surface portion of carbon. This hydrophilic carbon can be formed, for example, by performing a surface treatment such as an oxidation treatment or a plasma treatment on carbon. Since the other configurations are the same as those of the third embodiment, the description thereof will not be repeated.

In the first to third embodiments, the example in which the liquid water connection portion 24 or 24a is a through-hole has been described. However, as in the fourth embodiment, the liquid water connection portion 24b may be formed of a hydrophilic member.

Figure 16A:
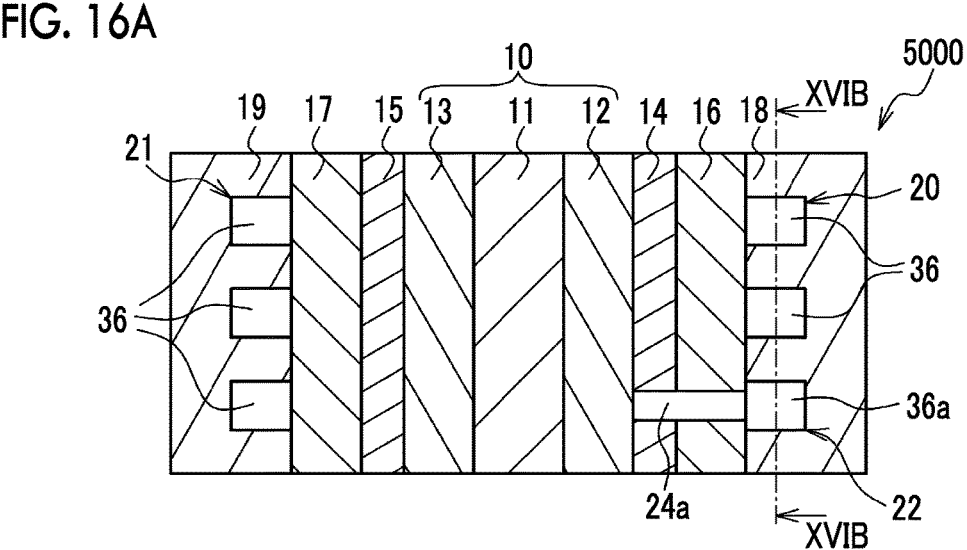
FIG. 16A is a sectional view showing a configuration of a single cell of a fuel cell according to a fifth embodiment.
Figure 16B:
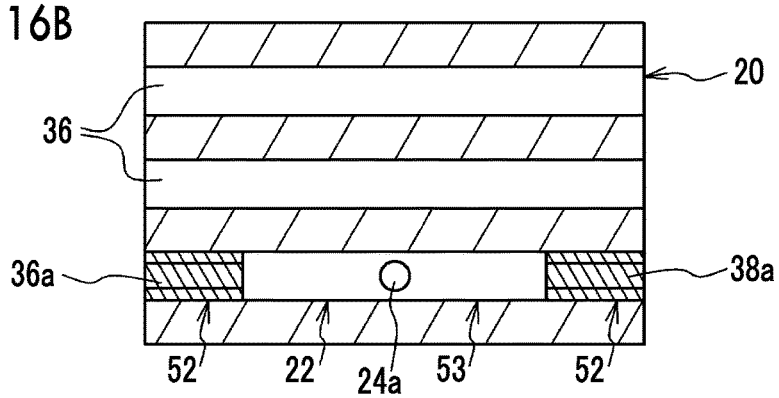
FIG. 16B is a sectional view taken along line XVIB-XVIB of FIG. 16A.
Figure 16C:
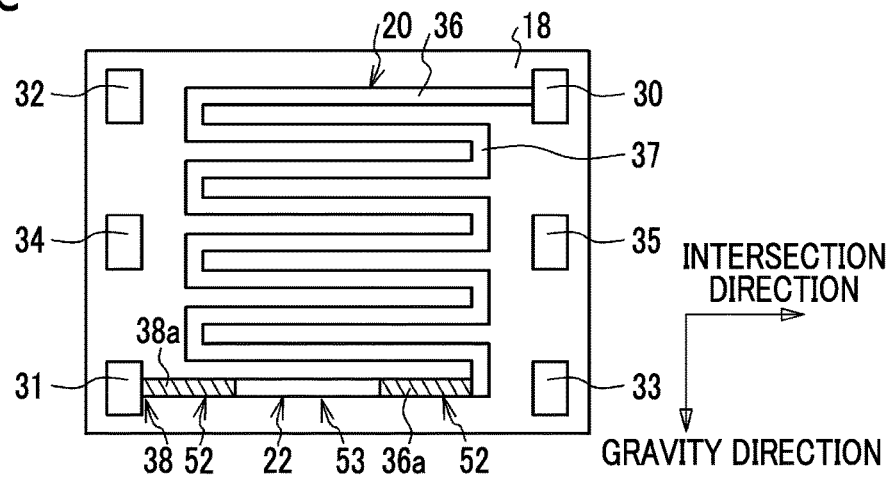
FIG. 16C is a plan view showing a cathode-side separator when seen from a cathode gas diffusion layer side.

FIG. 16A is a sectional view showing a configuration of a single cell 5000 of a fuel cell according to a fifth embodiment. FIG. 16B is a sectional view taken along line XVIB-XVIB of FIG. 16A. FIG. 16C is a plan view showing the cathode-side separator 18 when seen from the cathode gas diffusion layer 16 side. As shown in FIGS. 16A to 16C, in the single cell 5000, the first groove portion 36a linearly extends in the intersection direction intersecting the gravity direction and is connected to the air exhaust manifold 31. In the first groove portion 36a, two regions are provided, the two regions including: first regions 52 where a water exhaust inhibiting portion 38a formed of a water-repellent film is formed on a wall surface; and a second region 53 that is positioned between the first regions 52 and where the water exhaust inhibiting portion 38a is not formed. The second region 53 functions as the water storage portion 22. The water-repellent film can be formed by applying an aqueous dispersion of a fluororesin or an alcohol dispersion of a fluororesin using the same method as in FIG. 10. Since the other configurations are the same as those of the third embodiment, the description thereof will not be repeated.

As in the fifth embodiment, the water exhaust inhibiting portion 38a may be formed of the water-repellent film that is provided on the wall surface of the lowermost passage positioned on the lowermost side in the gravity direction in the cathode gas passage 20, and the second region 53 that is positioned between the first regions 52 and where the water exhaust inhibiting portion 38a is not provided may function as the water storage portion 22, the first regions 52 being a region where the water exhaust inhibiting portion 38a is provided. The first regions 52 where the water exhaust inhibiting portion 38a is provided repel water and thus are not wet. In addition, since the height of the first groove portion 36a is small, the liquid water 42 can be stored in the second region 53 due to surface tension. The water exhaust inhibiting portion 38a is not necessarily provided on both sides of the water storage portion 22 and may be provided only on the air exhaust manifold 31 side. Even in this configuration, the water exhaust inhibiting portion 38a inhibits water from being exhausted to the air exhaust manifold 31. Therefore, the liquid water can be stored in the water storage portion 22.

In the fifth embodiment, as in the second modification example of the first embodiment, the hydrophilic film 50 may be provided on a wall surface of the second region 53 of the first groove portion 36a which forms the water storage portion 22.

Figure 17A:
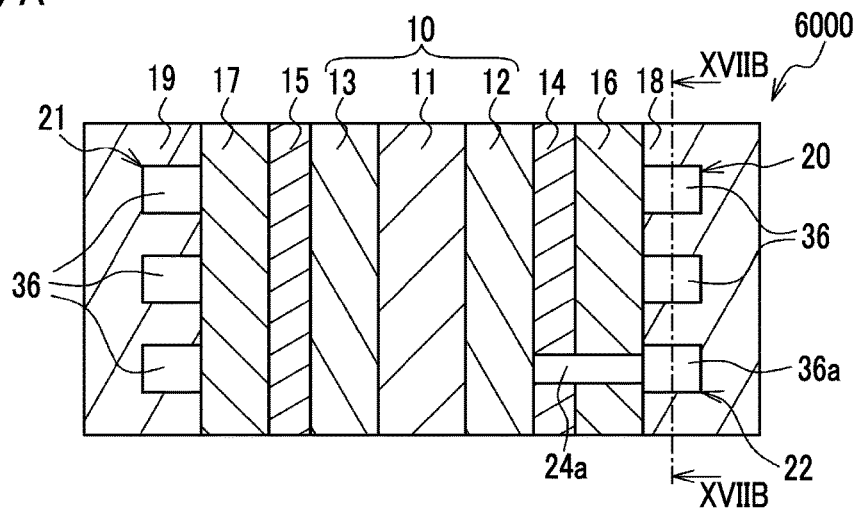
FIG. 17A is a sectional view showing a configuration of a single cell of a fuel cell according to a sixth embodiment.
Figure 17B:
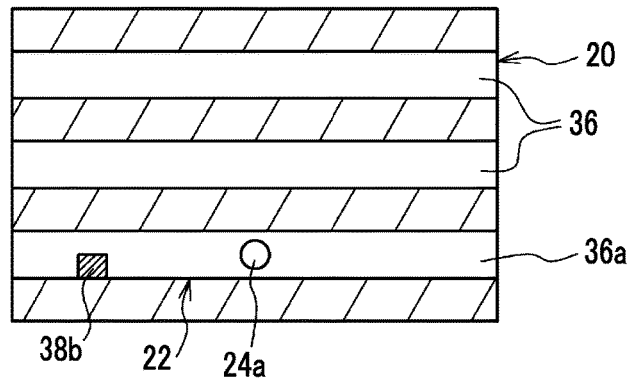
FIG. 17B is a sectional view taken along line XVIIB-XVIIB of FIG. 17A.
Figure 17C:
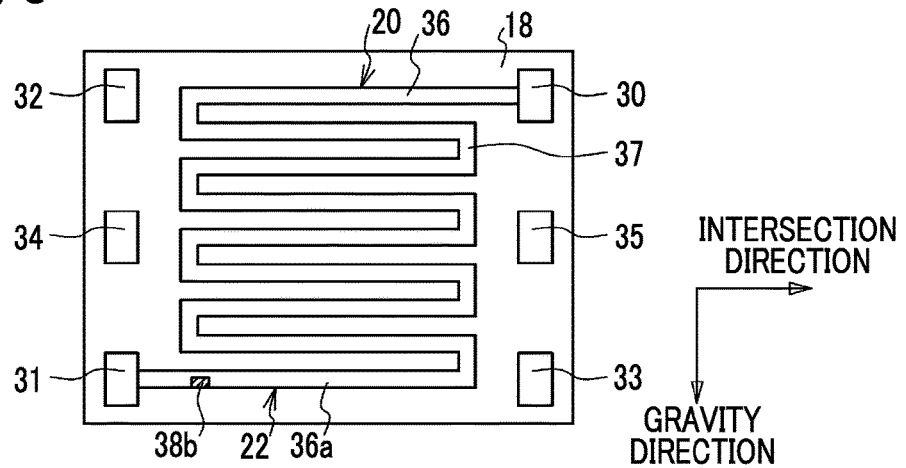
FIG. 17C is a plan view showing a cathode-side separator when seen from a cathode gas diffusion layer side.

FIG. 17A is a sectional view showing a configuration of a single cell 6000 of a fuel cell according to a sixth embodiment. FIG. 17B is a sectional view taken along line XVIIB-XVIIB of FIG. 17A. FIG. 17C is a plan view showing the cathode-side separator 18 when seen from the cathode gas diffusion layer 16 side. As shown in FIGS. 17A to 17C, in the single cell 6000, a water exhaust inhibiting portion 38b formed of a protrusion may be formed on the first groove portion 36a. A portion opposite to the air exhaust manifold 31 with respect to the water exhaust inhibiting portion 38b functions as the water storage portion 22. The separator which has convex-concave portions for forming the gas passage can be formed, for example, by press-forming a metal plate or by compressing-molding carbon. During this forming the water exhaust inhibiting portion 38b can also be formed at the same time. Accordingly, the water exhaust inhibiting portion 38b is formed of the same material as the separator. The separator can be manufactured by cutting using an end mill. In this case, the water exhaust inhibiting portion 38b can also be formed by cutting. Since the other configurations are the same as those of the fifth embodiment, the description thereof will not be repeated.

As in the sixth embodiment, the water exhaust inhibiting portion 38b may be formed of the protrusion that is provided in the lowermost passage positioned on the lowermost side in the gravity direction in the cathode gas passage 20. The water exhaust inhibiting portion 38b is not necessarily formed of the same material as the separator and may be formed of a different material from the separator.

Figure 18:
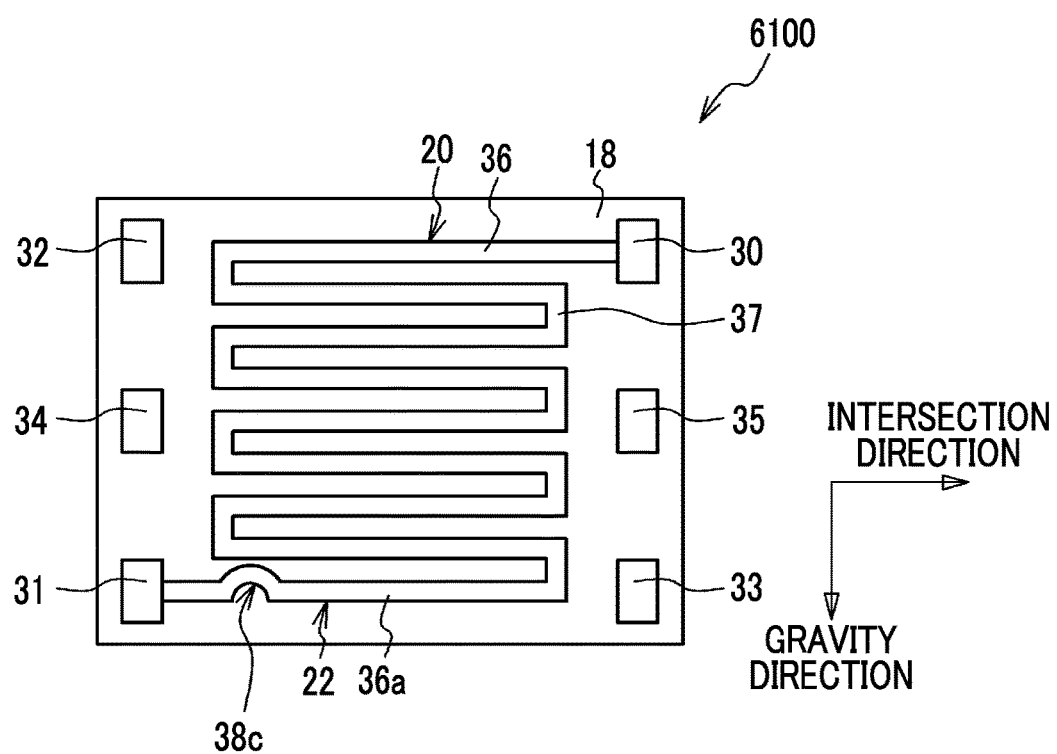
FIG. 18 is a plan view showing a cathode-side separator, which is included in a single cell of a fuel cell according to a first modification example of the sixth embodiment, when seen from a cathode gas diffusion layer side.

FIG. 18 is a plan view showing the cathode-side separator 18, which is included in a single cell 6100 of a fuel cell according to a first modification example of the sixth embodiment, when seen from the cathode gas diffusion layer 16 side. As shown in FIG. 18, in the single cell 6100, a water exhaust inhibiting portion 38c is formed by a portion of the first groove portion 36a being curved. Since the other configurations are the same as those of the sixth embodiment, the description thereof will not be repeated.

In the first to sixth embodiments, the respective features may be appropriately combined. That is, for example, by combining the respective features of the first to fourth embodiments, the liquid water connection portion 24 passing through the cathode-side water-repellent layer 14 may be formed of a hydrophilic member. In the first to sixth embodiments, the examples where the gas passage is a serpentine-shaped groove type passage which is formed of a serpentine-shaped groove has been described, but other types of passages may be adopted.

Figure 19:
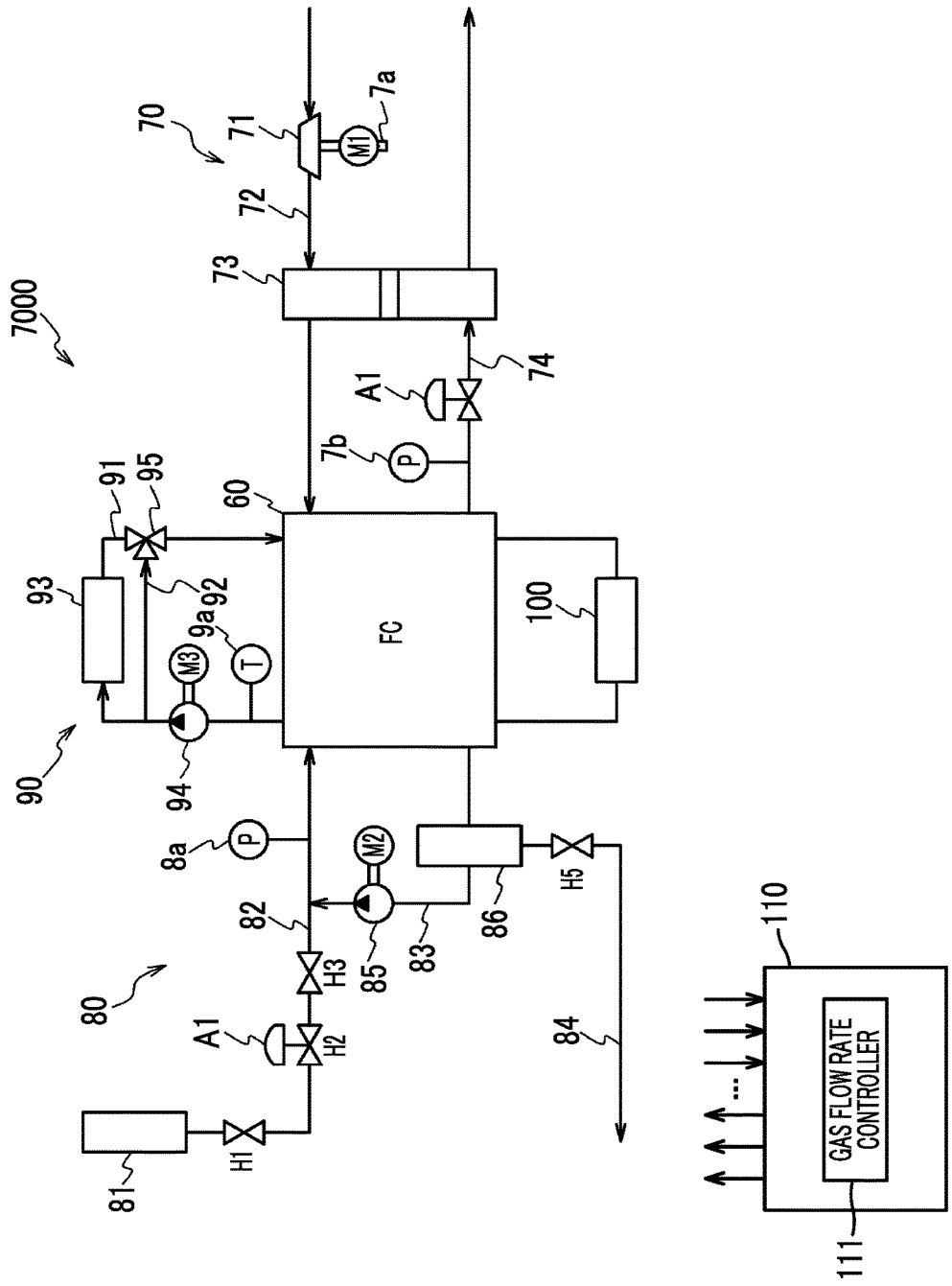
FIG. 19A is a diagram showing a configuration of a fuel cell system according to a seventh embodiment.
FIG. 19B is a diagram showing a gas flow rate controller for the fuel cell system of FIG. 19A.

FIG. 19A is a diagram showing a configuration of a fuel cell system 7000 according to a seventh embodiment. The fuel cell system 7000 is a system for supplying driving power and is mounted on, for example, a fuel cell vehicle or an electric vehicle. As shown in FIG. 19A, the fuel cell system 7000 includes a fuel cell 60 (fuel cell stack), an oxidant gas piping system 70, a fuel gas piping system 80, a coolant piping system 90, a loading device 100, and a control device 110 (FIG. 19B). The oxidant gas piping system 70 supplies, for example, air including oxygen to the fuel cell 60 as an oxidant gas. The fuel gas piping system 80 supplies, for example, hydrogen to the fuel cell 60 as a fuel gas.

As the fuel cell 60, the fuel cell according to any one of the first to sixth embodiments can be used.

The oxidant gas piping system 70 includes an air compressor 71, an oxidant gas supply path 72, a humidifying module 73, a cathode off gas passage 74, and a motor M1 that drives the air compressor 71.

The air compressor 71 is drive by the motor M1 to compress air including oxygen (oxidant gas), which has been taken in from outside air, and to supply the compressed air to a cathode of the fuel cell 60. A rotating speed detection sensor 7a which detects the rotating speed is attached to the motor M1. The oxidant gas supply path 72 guides the air, which has been supplied from the air compressor 71, to the cathode of the fuel cell 60. Cathode off gas is exhausted from the cathode of the fuel cell 60 through the cathode off gas passage 74.

The humidifying module 73 appropriately humidifies the air supplied to the fuel cell 60 by performing water exchange between the air in the low-wet condition which flows through the oxidant gas supply path 72 and the cathode off gas in the high wet condition which flows through the cathode off gas passage 74. The cathode off gas passage 74 exhausts the cathode off gas to the outside of the system. A back pressure regulating valve A1 is provided near a cathode outlet port of the cathode off gas passage 74. The pressure of the air exhausted from the fuel cell 60, that is, the cathode back pressure is regulated by the back pressure regulating valve A1. A pressure sensor 7b which detects the cathode back pressure is attached between the fuel cell 60 and the back pressure regulating valve A1 in the cathode off gas passage 74.

The fuel gas piping system 80 includes a fuel gas supply source 81, a fuel gas supply path 82, a fuel gas circulation path 83, an anode off gas passage 84, a fuel gas circulation pump 85, a gas-liquid separator 86, and a motor M2 that drives the fuel gas circulation pump 85.

The fuel gas supply source 81 is a tank which supplies hydrogen to the fuel cell 60 as the fuel gas. The fuel gas supply path 82 guides hydrogen, which has been discharged from the fuel gas supply source 81, to an anode of the fuel cell 60. In the fuel gas supply path 82, a tank valve H1, a regulator H2, and an injector H3 are provided in order from upstream. These components are electromagnetic valves which supply hydrogen to the fuel cell 60 or stop the supply thereof. By controlling the injector H3 based on a measured value of the pressure sensor 8a, the flow rate of hydrogen supplied to the fuel cell 60 can be controlled.

The fuel gas circulation path 83 circulates unreacted hydrogen in the fuel cell 60. In the fuel gas circulation path 83, the gas-liquid separator 86, the fuel gas circulation pump 85, and a check valve (not shown) are provided in order from upstream. Unreacted hydrogen exhausted from the fuel cell 60 is appropriately pressurized by the fuel gas circulation pump 85 and is guided to the fuel gas supply path 82. The backflow of hydrogen from the fuel gas supply path 82 to the fuel gas circulation path 83 is inhibited by the check valve. The anode off gas passage 84 exhausts the anode off gas including hydrogen, which has been exhausted from the fuel cell 60, and water, which is stored in the gas-liquid separator 86, to the outside of the system. In the anode off gas passage 84, an exhaust valve H5 is provided.

The coolant piping system 90 includes a coolant passage 91, a coolant bypass passage 92, a radiator 93, a coolant circulation pump 94, and a motor M3 that drives the coolant circulation pump 94. The radiator 93 supplies the coolant to the fuel cell 60 through the coolant passage 91 and receives the coolant which has been used to cool the fuel cell 60. As the coolant, for example, water or a mixture of water and ethylene glycol can be used. The coolant bypass passage 92 is provided in order to circulate the coolant without the coolant passing through the radiator 93. Whether to circulate the coolant through the radiator 93 or through the coolant bypass passage 92 is controlled by switching a rotary valve 95. The coolant circulation pump 94 regulates the circulation speed of the coolant. The internal temperature of the fuel cell 60 is regulated by the coolant circulation pump 94. A temperature sensor 9a which detects the temperature of the coolant flowing out from the fuel cell 60 is attached between the fuel cell 60 and the coolant circulation pump 94 in the coolant passage 91.

The loading device 100 is a device for measuring electrical characteristics of the fuel cell 60. The loading device 100 is electrically connected between a pair of current collector plates, which are provided on both outsides of the fuel cell 60 (fuel cell stack), and detects the total voltage of the fuel cell 60. The loading device 100 may be configured to be electrically connected between the separators of each single cell of the fuel cell and to detect the voltage per single cell. The loading device 100 detects the impedance of the fuel cell 60 based on a relationship between a voltage value and a current value flowing through the fuel cell 60 when varying the current value.

The control device 110 is configured to include a microcomputer including a central processing unit (CPU), a read only memory (ROM), and a random access memory (RAM). The control device 110 controls the operation of the system based on a program stored on the ROM. Not only the above-described program but also various maps, thresholds, and the like used for controlling the system are stored on the ROM. Based on a required output for the fuel cell 60, outputs of the loading device 100 and various sensors, and the like, the control device 110 controls various valves, the fuel gas circulation pump 85, the coolant circulation pump 94, the air compressor 71, and the like so as to control the operation of the system including a cationic impurity exhaust treatment described below. The control device 110 functions as the gas flow rate controller 111 in the cationic impurity exhaust treatment. The gas flow rate controller 111 controls the flow rate of gas circulating in the gas passage, which is provided in the separator, by controlling the air compressor 71 and the injector H3.

Figure 20:
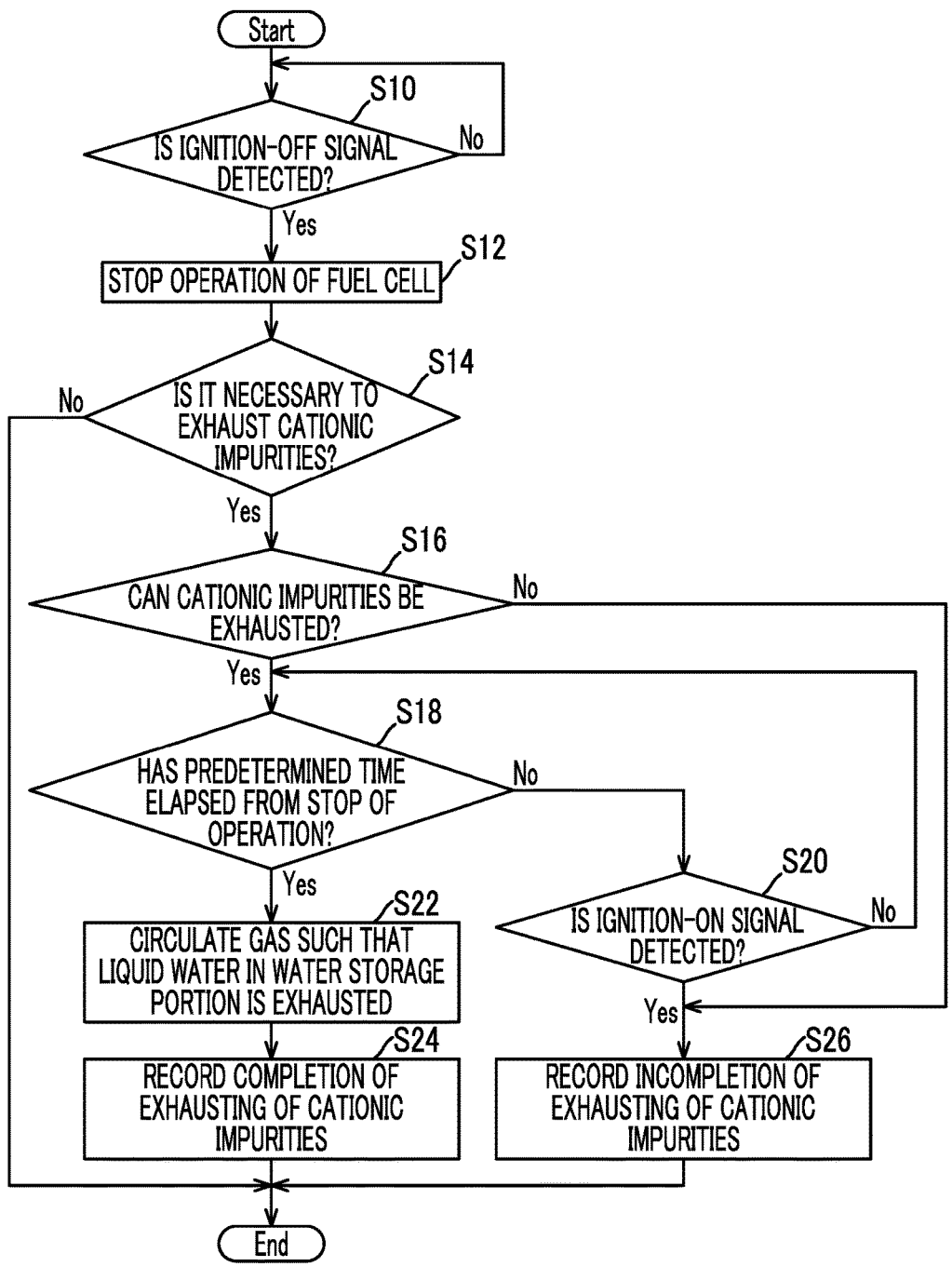
FIG. 20 is a flowchart showing an example of a cationic impurity exhaust treatment using a control device in the fuel cell system according to the seventh embodiment.

FIG. 20 is a flowchart showing an example of the cationic impurity exhaust treatment using the control device 110 in the fuel cell system 7000 according to the seventh embodiment. As shown in FIG. 20, the control device 110 waits until an ignition-off signal is detected in Step S10. After detecting the ignition-off signal (Step S10: Yes), the control device 110 proceeds to Step S12 and stops the operation of the fuel cell 60.

Next, in Step S14, the control device 110 determines whether or not it is necessary to exhaust the cationic impurities 40. For example, in a case where an immediately previous operating time of the fuel cell 60 (an operating time required to stop the operation in Step S12 from the activation of the fuel cell 60 before Step S12) is a predetermined time or longer, the control device 110 determines that it is necessary to exhaust the cationic impurities 40. The reason is as follows: as the operating time of the fuel cell 60 increases, the amount of the cationic impurities 40 incorporated increases. In addition, in a case where any one of the following cases occurs, it is thought that the amount of the cationic impurities 40 is large, and thus the control device 110 may determine that it is necessary to exhaust the cationic impurities 40.

1. A case where there is a record regarding the incompletion of exhausting of the cationic impurities is present in a recording unit 2. A case where current-voltage characteristics of the fuel cell 60 deteriorates significantly (for example, a case where a voltage value is lower than a threshold under predetermined conditions)

3. A case where an elapsed time from the previous cationic impurity exhaust treatment is a predetermined time (for example, 5000 hours) or longer 4. A case where an operating time from the previous cationic impurity exhaust treatment is a predetermined time (for example, 1000 hours) or longer 5. A case where an traveling distance from the previous cationic impurity exhaust treatment is a predetermined distance (for example, 5000 km) or longer 6. A case where an instruction to perform the cationic impurity exhaust treatment is given by the user (for example, a case where a button provided in a console panel is pushed by the user)

In a case where it is determined that it is necessary to exhaust the cationic impurities in Step S14 (Step S14: Yes), the control device 110 proceeds to Step S16 and determines whether or not the fuel cell system is in an environment in which the cationic impurities can be exhausted. For example, in a case where the remaining battery capacity is a predetermined value or higher and the outside air temperature is neither below zero nor a predetermined temperature or higher, the control device 110 determines that the fuel cell system is in an environment in which the cationic impurities can be exhausted. The reason is as follows. In a case where the remaining battery capacity is lower than the predetermined value, it is difficult to secure power required for the cationic impurity exhaust treatment, and in a case where the outside air temperature is below zero, the liquid water 42 stored in the water storage portion 22 may freeze. In addition, heat of the fuel cell is naturally dissipated by outside air after the finish of power generation of the fuel cell. At this time, in a case where the outside air temperature is a predetermined temperature or higher, the temperature of the fuel cell after power generation is stopped is not decreased sufficiently. Therefore, the amount of condensed liquid water is decreased, the liquid water 42 is not sufficiently stored. On the other hand, in a case where it is determined that it is not necessary to exhaust the cationic impurities in Step S14 (Step S14: No), the control device 110 finishes the cationic impurity exhaust treatment.

In a case where it is determined that the fuel system is in an environment in which the cationic impurities can be exhausted in Step S16 (Step S16: Yes), the control device 110 proceeds to Step S18 and determines whether or not a predetermined time elapses after the operation is stopped in Step S12. In a case where it is determined that the predetermined time does not elapse in Step S18 (Step S18: No), the control device 110 proceeds to Step S20 and determines whether or not an ignition-on signal is detected. In a case where the ignition-on signal is not detected (Step S20: No), the control device 110 returns to Step S18. The reason is as follows. When the operation of the fuel cell 60 is stopped, as shown in FIG. 6, the liquid water 42 (dew condensation water) is stored in the water storage portion 22 formed in the cathode gas passage 20. In this case, since the moving speed of the cationic impurities 40 is slow, the amount of the cationic impurities 40 diffused in the liquid water 42 of the water storage portion 22 is small unless a given amount of time elapses.

In a case where it is determined that the predetermined time elapses in Step S18 (Step S18: Yes), the control device 110 proceeds to Step S22 and controls the air compressor 71 to circulate air in the cathode gas passage 20 at a flow rate, which is higher than a flow rate corresponding to the amount of power generated based on a required output of the fuel cell 60, such that the liquid water 42 stored in the water storage portion 22 is exhausted. Here, the power generation of the fuel cell 60 is stopped. Therefore, a first gas flow rate corresponding to the amount of power generated is zero. On the other hand, air is circulated at a second gas flow rate at which the liquid water 42 of the water storage portion 22 can be exhausted. The second gas flow rate may be a predetermined value or a variable value which is determined based on immediately previous operating conditions, the outside air temperature, and the like. By circulating air in the cathode gas passage 20, the liquid water 42 stored in the water storage portion 22 can be exhausted. By the liquid water 42 of the water storage portion 22 being exhausted, the cationic impurities 40 in the liquid water 42 are also exhausted to the outside of the fuel cell. Next, the control device 110 proceeds to Step S24, records the completion of exhausting of the cationic impurities on a recording unit, and finishes the cationic impurity exhaust treatment.

In a case where the ignition-on signal is detected in Step S20 (Step S20: Yes), the control device 110 proceeds to Step S26, records the incompletion of exhausting of the cationic impurities on the recording unit, and finishes the cationic impurity exhaust treatment. In a case where it is determined that the fuel system is not in an environment in which the cationic impurities can be exhausted in Step S16 (Step S16: No), similarly, the control device 110 proceeds to Step S26, records the incompletion of exhausting of the cationic impurities on the recording unit, and finishes the cationic impurity exhaust treatment.

According to the seventh embodiment, while the fuel cell 60 is stopped, the control device 110 circulates air in the cathode gas passage 20 such that the liquid water 42 stored in the water storage portion 22 is exhausted (Step S22). As a result, the liquid water 42 stored in the water storage portion 22 can be exhausted, and a large amount of the cationic impurities 40 can be exhausted to the outside of the fuel cell.

According to the seventh embodiment, in a case where the immediately previous operating time of the fuel cell 60 is shorter than the predetermined time, the control device 110 does not circulate air in the cathode gas passage 20 (Step S14). The cationic impurities 40 are contained in the liquid water 42 by incorporation from in-take air or by elution from materials constituting the membrane electrode assembly 10. Therefore, it is thought that the amount of the cationic impurities 40 increase depending on the operating time of the fuel cell 60. Therefore, in a case where the operating time of the fuel cell 60 is shorter than the predetermined time, the amount of the cationic impurities 40 is not that large. Therefore, by not circulating air in the cathode gas passage 20, unnecessary power consumption is reduced, and the fuel efficiency can be improved.

According to the seventh embodiment, in a case where the immediately previous stoppage time of the fuel cell 60 is shorter than the predetermined time, the control device 110 does not circulate air in the cathode gas passage 20 (Step S18). A long period of time is required for the cationic impurities 40 to be diffused from the cathode catalyst layer 12 to the water storage portion 22 while the fuel cell 60 is stopped. Therefore, in a case where the stoppage time of the fuel cell 60 is shorter than the predetermined time, the amount of the cationic impurities 40 in the water storage portion 22 is not that large. Therefore, by not circulating air in the cathode gas passage 20, unnecessary power consumption is reduced, and the fuel efficiency can be improved.

In the seventh embodiment, the example where the determination in Step S14 is performed based on the immediately previous operating time of the fuel cell 60 has been described. However, the determination in Step S14 may be performed based on the total operating time of the fuel cell 60 (the total operating time from the first activation of the fuel cell 60).

Figure 21:
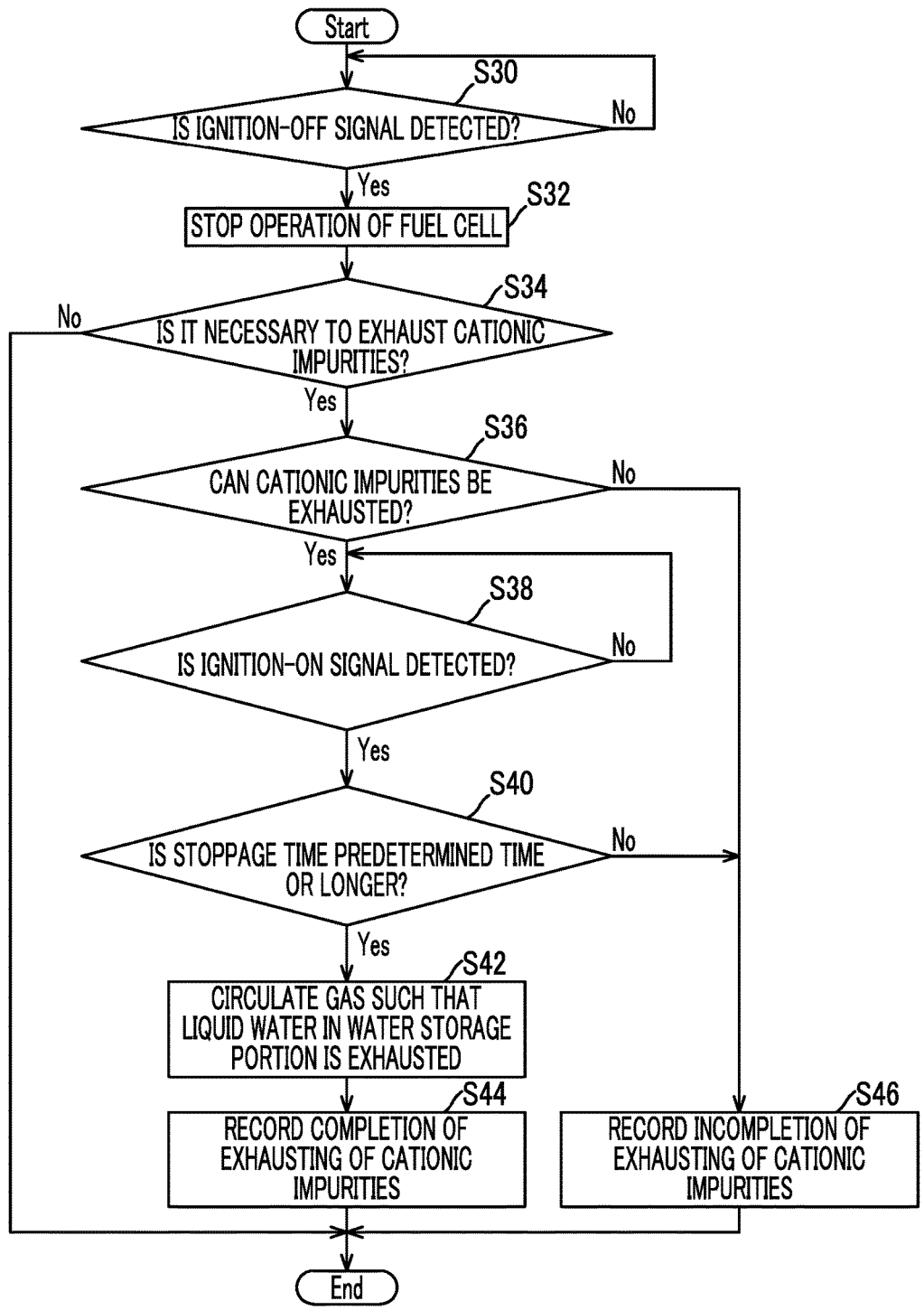
FIG. 21 is a flowchart showing an example of a cationic impurity exhaust treatment using a control device in a fuel cell system according to an eighth embodiment.

Since a configuration of a fuel cell system according to an eighth embodiment is the same as in the seventh embodiment, the description thereof will not be repeated. FIG. 21 is a flowchart showing an example of the cationic impurity exhaust treatment using the control device 110 in the fuel cell system according to the eighth embodiment. As shown in FIG. 21, first, the control device 110 performs the treatments of Steps S30 to S36. Since the treatments of Steps S30 to S36 are the same as the treatments of Steps S10 to S16 of FIG. 20, the description thereof will not be repeated.

In a case where it is determined that the fuel system is in an environment in which the cationic impurities can be exhausted in Step S36 (Step S36: Yes), the control device 110 proceeds to Step S38 and waits until an ignition-on signal is detected. After the ignition-on signal is detected (Step S38: Yes), the control device 110 proceeds to Step S40. In Step S40, the control device 110 determines whether or not a stoppage time required to detect the ignition-on signal in Step S38 from the stop of the fuel cell 60 in Step S32 is a predetermined time or longer.

In a case where it is determined that the predetermined time elapses in Step S40 (Step S40: Yes), the control device 110 proceeds to Step S42 and controls the air compressor 71 to circulate air in the cathode gas passage 20 at a flow rate, which is higher than a flow rate corresponding to the amount of power generated based on a required output of the fuel cell 60, such that the liquid water 42 stored in the water storage portion 22 is exhausted. During a normal power generation of the fuel cell, a first gas flow rate corresponding to the amount of power generated based on the required output is set. On the other hand, air is circulated at a second gas flow rate which is higher than the first gas flow rate and at which the liquid water 42 of the water storage portion 22 can be exhausted. The second gas flow rate may be the same as the second gas flow rate during the power generation stop in the seventh embodiment or may be larger than that in the seventh embodiment by adding a flow rate required for power generation thereto. Next, the control device 110 proceeds to Step S44, records the completion of exhausting of the cationic impurities on the recording unit, and finishes the cationic impurity exhaust treatment.

In a case where it is determined that the predetermined time does not elapse in Step S40 (Step S40: No), the control device 110 proceeds to Step S46, records the incompletion of exhausting of the cationic impurities on the recording unit, and finishes the cationic impurity exhaust treatment. In a case where it is determined that the fuel system is not in an environment in which the cationic impurities can be exhausted in Step S36 (Step S36: No), similarly, the control device 110 proceeds to Step S46, records the incompletion of exhausting of the cationic impurities on the recording unit, and finishes the cationic impurity exhaust treatment.

According to the eighth embodiment, during the activation of the fuel cell 60 (when the ignition-on signal is detected), the control device 110 circulates air in the cathode gas passage 20 at a flow rate which is higher than a gas flow rate corresponding to the amount of power generated based on a required output of the fuel cell 60. With the above-described configuration, similarly the liquid water 42 stored in the water storage portion 22 can be exhausted, and the cationic impurities 40 can be exhausted to the outside of the fuel cell.

According to the eighth embodiment, in a case where the immediately previous operating time of the fuel cell 60 is shorter than the predetermined time, the control device 110 does not circulate air in the cathode gas passage 20 at a flow rate which is higher than a gas flow rate corresponding to the amount of power generated based on a required output of the fuel cell 60 (Step S34). As a result, unnecessary power consumption is reduced, and the fuel efficiency can be improved.

According to the eighth embodiment, in a case where the immediately previous stoppage time of the fuel cell 60 is shorter than the predetermined time, the control device 110 does not circulate air in the cathode gas passage 20 at a flow rate which is higher than a gas flow rate corresponding to the amount of power generated based on a required output of the fuel cell 60 (Step S40). As a result, unnecessary power consumption is reduced, and the fuel efficiency can be improved.

Figure 22:
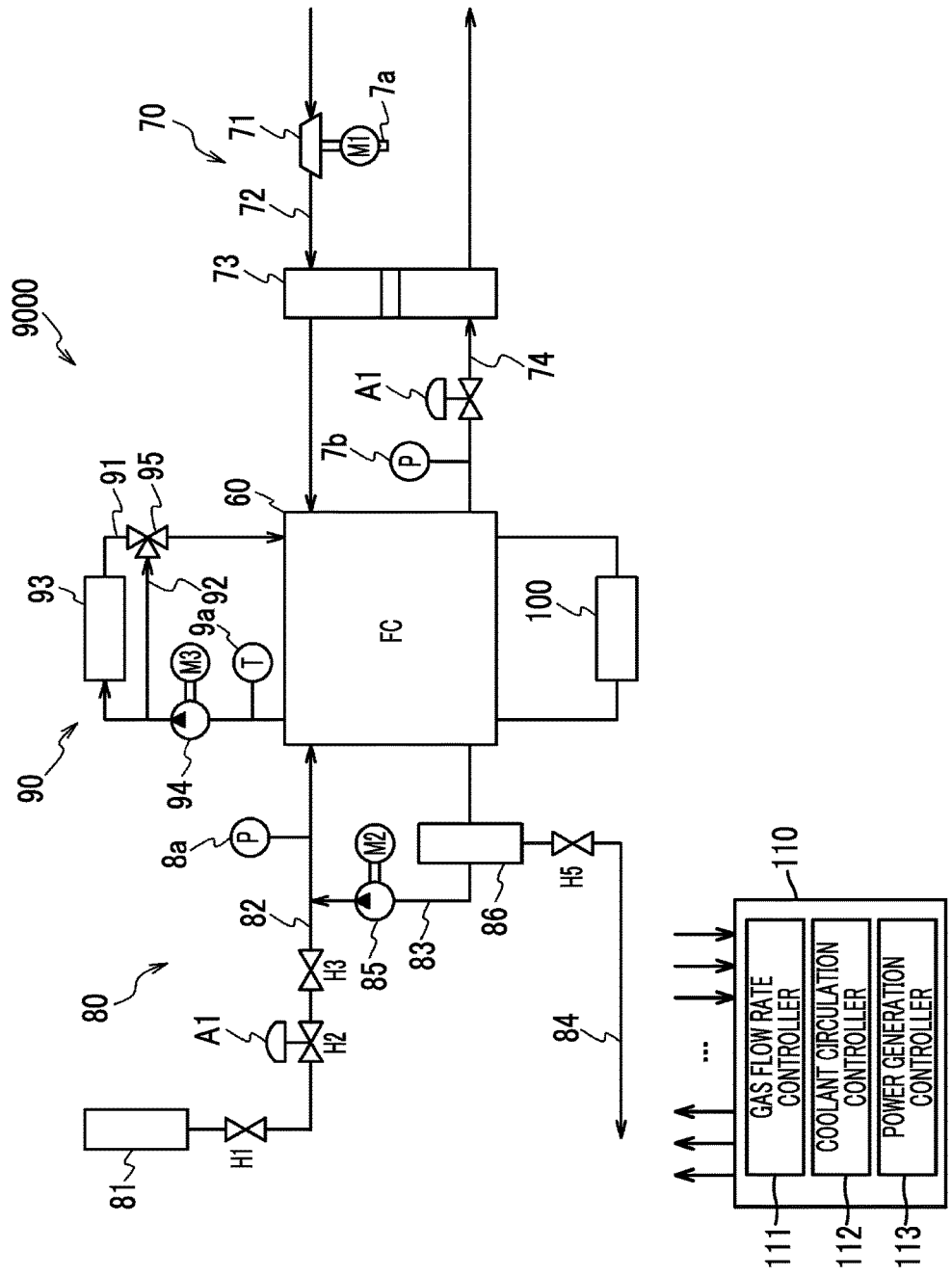
FIG. 22A is a diagram showing a configuration of a fuel cell system according to a ninth embodiment.
FIG. 22B is a diagram showing a gas flow rate controller, coolant circulation controller, and power generation controller for the fuel cell system of FIG. 22A.

FIG. 22A is a diagram showing a configuration of a fuel cell system 9000 according to a ninth embodiment. As shown in FIG. 22A, in the fuel cell system 9000 according to the ninth embodiment, the control device 110 functions not only as the gas flow rate controller 111 (FIG. 22B), but also as a coolant circulation controller 112 (FIG. 22B) and a power generation controller 113 (FIG. 22B) in the cationic impurity exhaust treatment. The coolant circulation controller 112 controls the circulation of the coolant in the coolant passage 91 by controlling the coolant circulation pump 94. The power generation controller 113 controls the power generation of the fuel cell 60. Since the other configurations are the same as those of the seventh embodiment, the description thereof will not be repeated.

Figure 23:
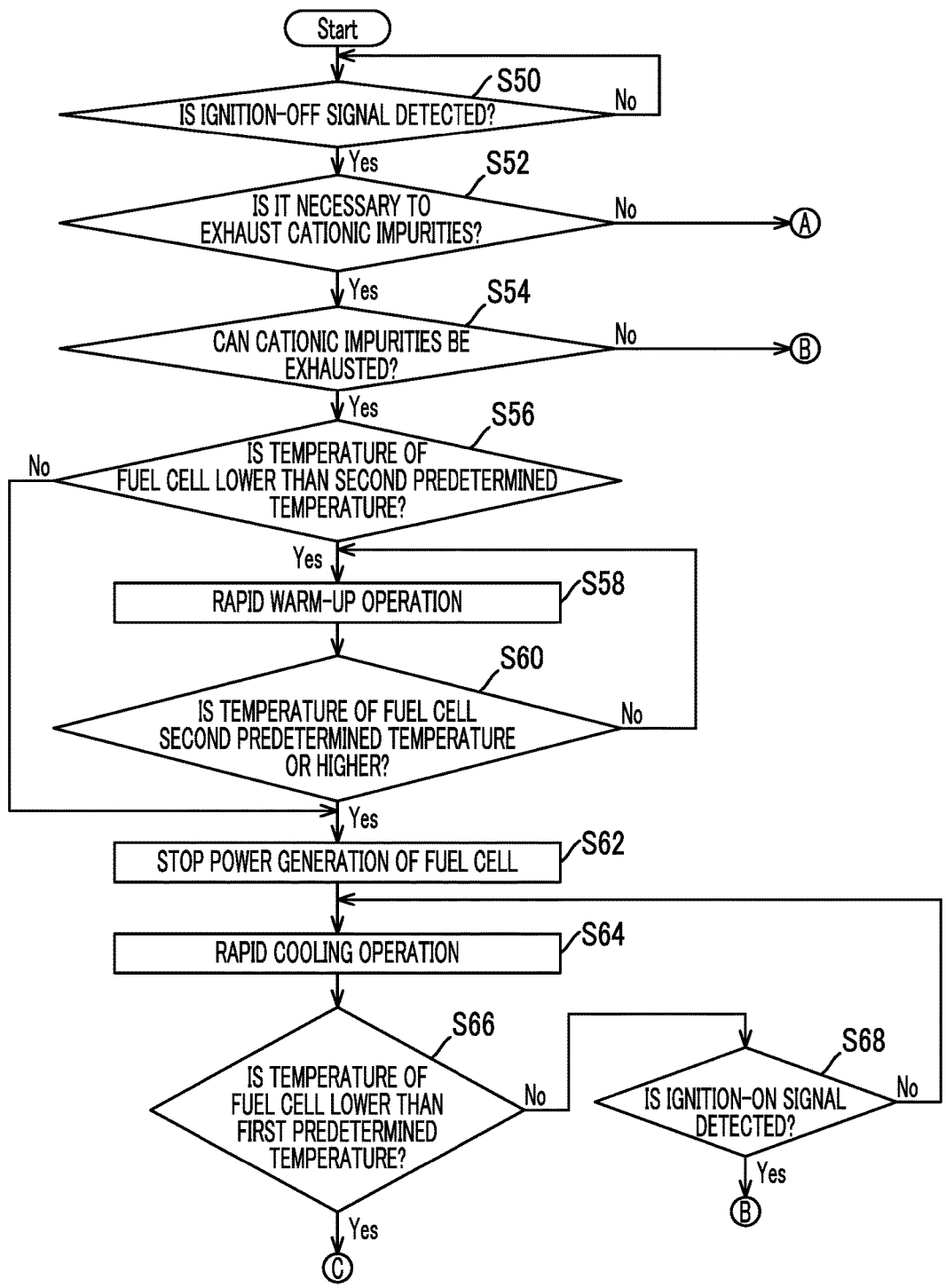
FIG. 23 is a flowchart (part 1) showing an example of a cationic impurity exhaust treatment using a control device in the fuel cell system according to the ninth embodiment.
Figure 24:
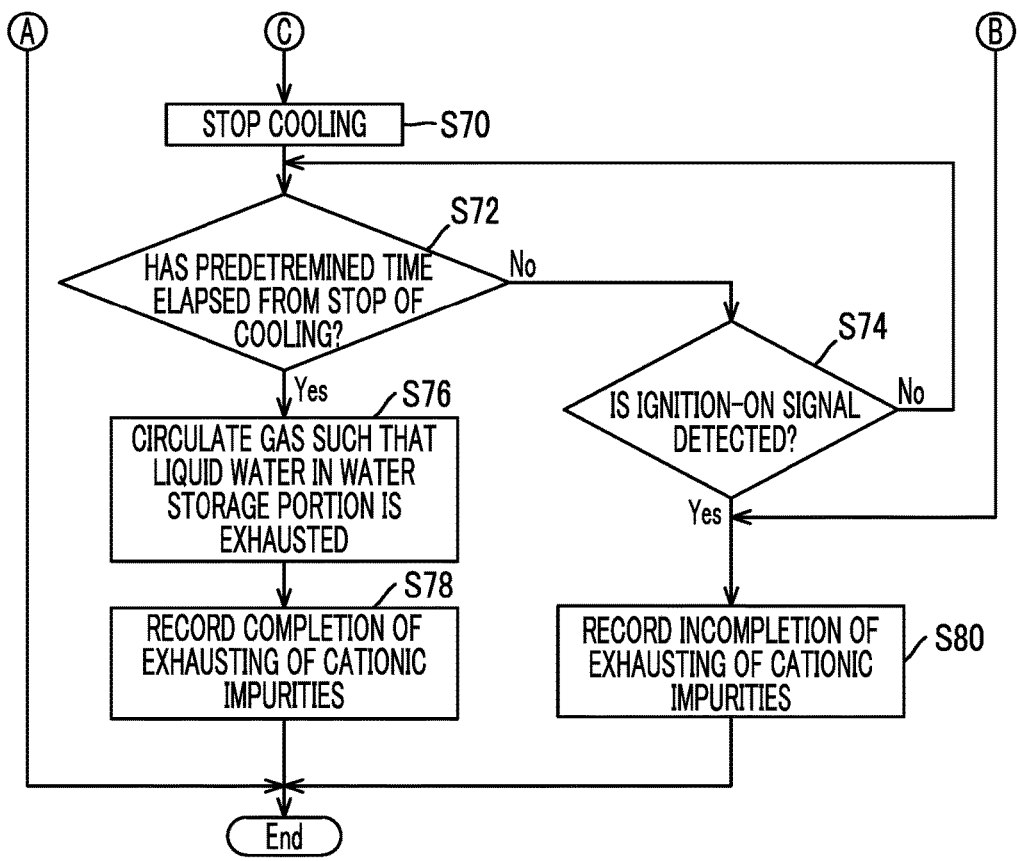
FIG. 24 is the flowchart (part 2) showing the example of the cationic impurity exhaust treatment using the control device in the fuel cell system according to the ninth embodiment.

FIGS. 23 and 24 show a flowchart showing an example of the cationic impurity exhaust treatment using the control device 110 in the fuel cell system 9000 according to the ninth embodiment. As shown in FIGS. 23 and 24, first, the control device 110 performs the treatments of Steps S50 to S54. Since the treatments of Steps S50 to S54 are the same as the treatments of Steps S10, S14, and S16 of FIG. 20, the description thereof will not be repeated.

In a case where it is determined that the fuel system is in an environment in which the cationic impurities can be exhausted in Step S54 (Step S54: Yes), the control device 110 proceeds to Step S56 and determines whether or not the temperature of the fuel cell 60 is lower than a second predetermined temperature (for example, 65° C.). The temperature of the fuel cell 60 can be obtained from the temperature which is detected by, for example, the temperature sensor 9a provided in the coolant passage 91. The temperature of the fuel cell 60 may be obtained using other methods.

In a case where it is determined that the temperature of the fuel cell 60 is lower than the second predetermined temperature in Step S56 (Step S56: Yes), the control device 110 proceeds to Step S58 and performs a rapid warm-up operation by causing the fuel cell 60 to generate power. For example, the control device 110 causes the fuel cell 60 to generate power by controlling the coolant circulation pump 94 to reduce the flow rate of the coolant, which is supplied to the fuel cell 60, to be lower than that during the normal power generation, or the control device 110 supplies the coolant to the fuel cell 60 through the coolant bypass passage 92 by switching the rotary valve 95 to the coolant bypass passage 92 side. In this way, the control device 110 causes the fuel cell 60 to generate power under conditions in which the temperature of the fuel cell 60 is likely to increase. By performing the rapid warm-up operation, the temperature of the fuel cell 60 can be increased, and the amount of water vapor included in gas in the fuel cell 60 can be increased.

Next, in Step S60, the control device 110 determines whether or not the temperature of the fuel cell 60 is increased to be the second predetermined temperature or higher due to rapid warm-up operation. In a case where it is determined that the temperature of the fuel cell 60 is lower than the second predetermined temperature in Step S60 (Step S60: No), the control device 110 returns to Step S58 and continues the rapid warm-up operation. On the other hand, in a case where it is determined that the temperature of the fuel cell 60 is increased to be the second predetermined temperature or higher in Step S60 (Step S60: Yes), the control device 110 proceeds to Step S62 and stops the power generation (operation) of the fuel cell 60. In a case where it is determined that the temperature of the fuel cell 60 is the second predetermined temperature or higher in Step S56 (Step S56: No), the control device 110 proceeds to Step S62 and stops the power generation (operation) of the fuel cell 60 without performing the rapid warm-up operation.

Next, in Step S64, the control device 110 performs a rapid cooling operation on the fuel cell 60. For example, the control device 110 drives the coolant circulation pump 94 to circulate the coolant in the coolant passage 91 through the radiator 93 such that the fuel cell 60 is rapidly cooled. In a case where the temperature of the fuel cell 60 is decreased by natural heat dissipation without circulating the coolant, for example, the temperature of the outer circumference of the fuel cell 60 such as the vicinity of the manifold which is likely to be cooled is decreased first. Therefore, in this region, dew condensation is likely to occur. In addition, since water vapor moves to a cold region, water vapor in the vicinity of the membrane electrode assembly 10 moves to the vicinity of the manifold. Therefore, when the temperature of the membrane electrode assembly 10 is decreased, the amount of water vapor in the vicinity of the membrane electrode assembly 10 is reduced, and the amount of dew condensation water produced in the vicinity of the membrane electrode assembly 10 is reduced. However, by circulating the coolant in the coolant passage 91 to supply the coolant to the fuel cell 60, the inside of the fuel cell 60 can be cooled, and thus a large amount of dew condensation water can be produced in the vicinity of the membrane electrode assembly 10. As a result, a large amount of the liquid water 42 can be stored in the water storage portion 22. In Step S54, the predetermined temperature for determining whether or not the outside air temperature is the predetermined temperature or higher may be the same as or different from the predetermined temperature of Step S16 in the seventh embodiment. The reason for this is as follows: in a case where the heat of the fuel cell 60 is naturally dissipated by outside air, the amount of the liquid water remaining in the fuel cell is different from that in a case where the fuel cell 60 is rapidly cooled using the coolant.

Next, in Step S66, the control device 110 determines whether or not the temperature of the fuel cell 60 is decreased to be lower than a first predetermined temperature (for example, 30° C.). In a case where it is determined that the temperature of the fuel cell 60 is the first predetermined temperature or higher in Step S66 (Step S66: No), the control device 110 determines whether or not an ignition-on signal is detected (Step S68). In a case where the ignition-on signal is not detected (Step S68: No), the control device 110 returns to Step S64 and continues the rapid cooling operation.

In a case where it is determined that the temperature of the fuel cell 60 is decreased to be lower than the first predetermined temperature in Step S66 (Step S66: Yes), the control device 110 proceeds to Step S70 and stops the cooling on the fuel cell 60.

Next, in Step S72, the control device 110 determines whether or not a predetermined time elapses after the cooling is stopped in Step S70. In a case where it is determined that the predetermined time does not elapse in Step S72 (Step S72: No), the control device 110 determines whether or not an ignition-on signal is detected (Step S74). In a case where the ignition-on signal is not detected (Step S74: No), the control device 110 returns to Step S72.

In a case where it is determined that the predetermined time elapses in Step S72 (Step S72: Yes), the control device 110 proceeds to Step S76 and circulates air in the cathode gas passage 20 such that the liquid water 42 stored in the water storage portion 22 is exhausted. Next, the control device 110 proceeds to Step S78, records the completion of exhausting of the cationic impurities on the recording unit, and finishes the cationic impurity exhaust treatment.

In a case where the ignition-on signal is detected in Step S68 or Step S74 (Step S68: Yes or Step S74: Yes), the control device 110 proceeds to Step S80, records the incompletion of exhausting of the cationic impurities on the recording unit, and finishes the cationic impurity exhaust treatment. In a case where it is determined that the fuel system is not in an environment in which the cationic impurities can be exhausted in Step S54 (Step S54: No), similarly, the control device 110 proceeds to Step S80, records the incompletion of exhausting of the cationic impurities on the recording unit, and finishes the cationic impurity exhaust treatment.

According to the ninth embodiment, after the power generation (operation) of the fuel cell 60 is stopped, the control device 110 drives the coolant circulation pump 94 to circulate the coolant in the coolant passage 91 until the temperature of the fuel cell 60 is lower than the first predetermined temperature (Step S64, S66). After the temperature of the fuel cell 60 is lower than the first predetermined temperature and the circulation of the coolant is finished, the control device 110 circulates air in the cathode gas passage 20 such that the liquid water 42 stored in the water storage portion 22 is exhausted (Step S76). As a result, as described above, the inside of the fuel cell 60 can be cooled. Therefore, a large amount of dew condensation water can be produced in the vicinity of the membrane electrode assembly 10, and a large amount of the liquid water 42 can be stored in the water storage portion 22. Accordingly, a large amount of the cationic impurities 40 can be diffused in the liquid water 42 stored in the water storage portion 22, and by exhausting the liquid water 42, a large amount of the cationic impurities 40 can be exhausted to the outside of the fuel cell.

According to the ninth embodiment, in a case where the temperature of the fuel cell 60 is lower than the second predetermined temperature when a signal for stopping the fuel cell 60 is received, the control device 110 causes the fuel cell 60 to generate power until the temperature of the fuel cell 60 is the second predetermined temperature or higher (Steps S56 to S60). After the temperature of the fuel cell 60 is the second predetermined temperature or higher and the fuel cell 60 is stopped, the control device 110 circulates the coolant until the temperature of the fuel cell 60 is lower than the first predetermined temperature (Steps S64 and S66). As described above, by increasing the temperature of the fuel cell 60, and the amount of water vapor included in the fuel cell 60 can be increased. Therefore, by cooling the inside of the fuel cell 60 in this state, a larger amount of dew condensation water can be produced than that in the vicinity of the membrane electrode assembly 10.

In the ninth embodiment, in Step S58, the control device 110 may cause the fuel cell 60 to generate power until the temperature of the fuel cell 60 is the second predetermined temperature or higher by reducing the supply amount of air to be less than that during the normal power generation. The reason for this is as follows. In a case where the supply amount of air is reduced, the amount of water produced is reduced, but the amount of water exhausted is also reduced due to the flow rate of air supplied. Therefore, as a whole, the amount of the liquid water remaining in the fuel cell 60 can be increased. In the ninth embodiment, after the ignition-off signal is detected, both the rapid warm-up operation and the rapid cooling operation are performed. However, only the rapid cooling operation may be performed. Even in a case where only the rapid cooling operation is performed, the amount of the liquid water remaining in the fuel cell 60 can be increased.

Figure 25:
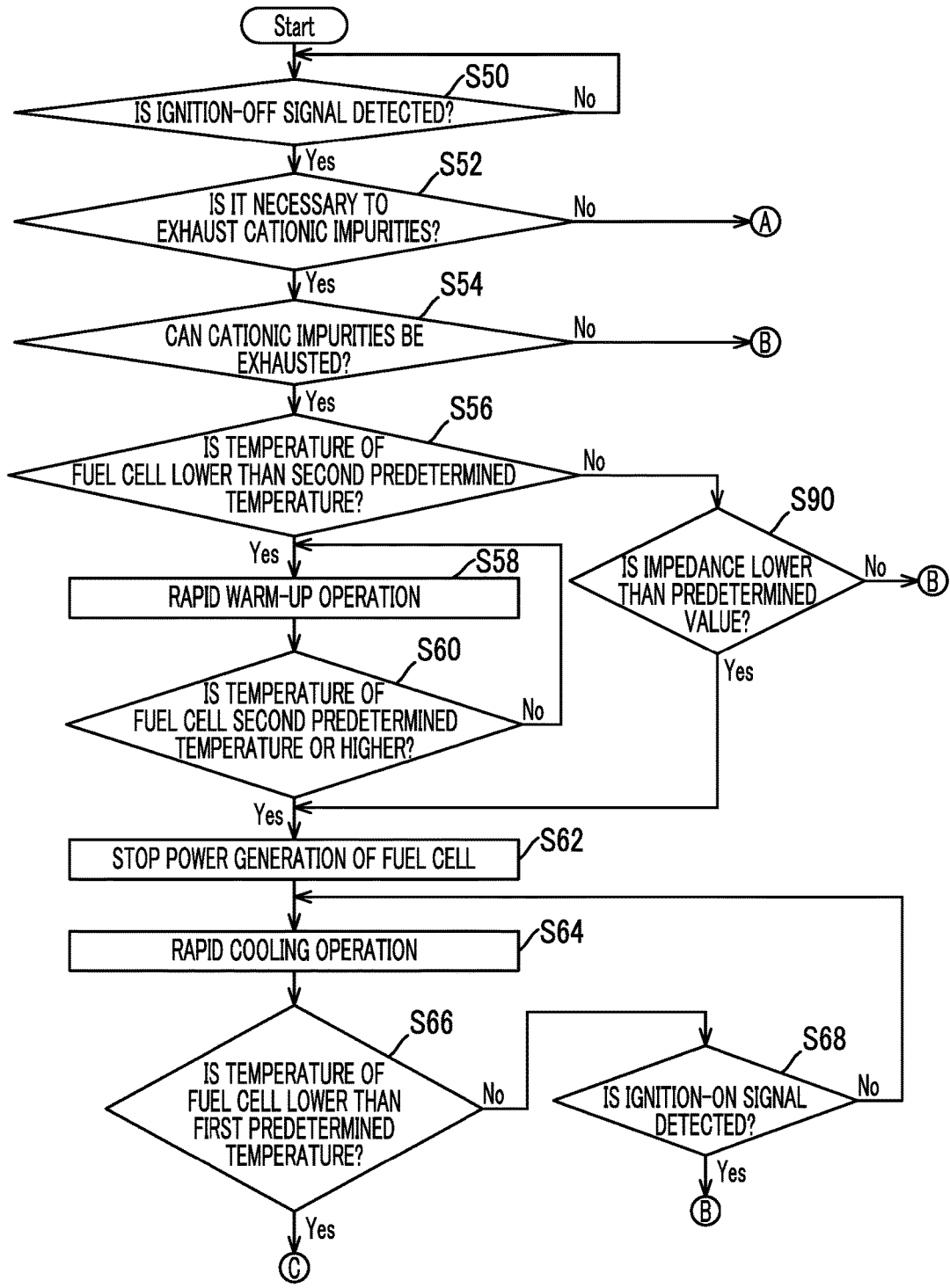
FIG. 25 is a flowchart (part 1) showing an example of a cationic impurity exhaust treatment using a control device in a fuel cell system according to a tenth embodiment.
Figure 26:
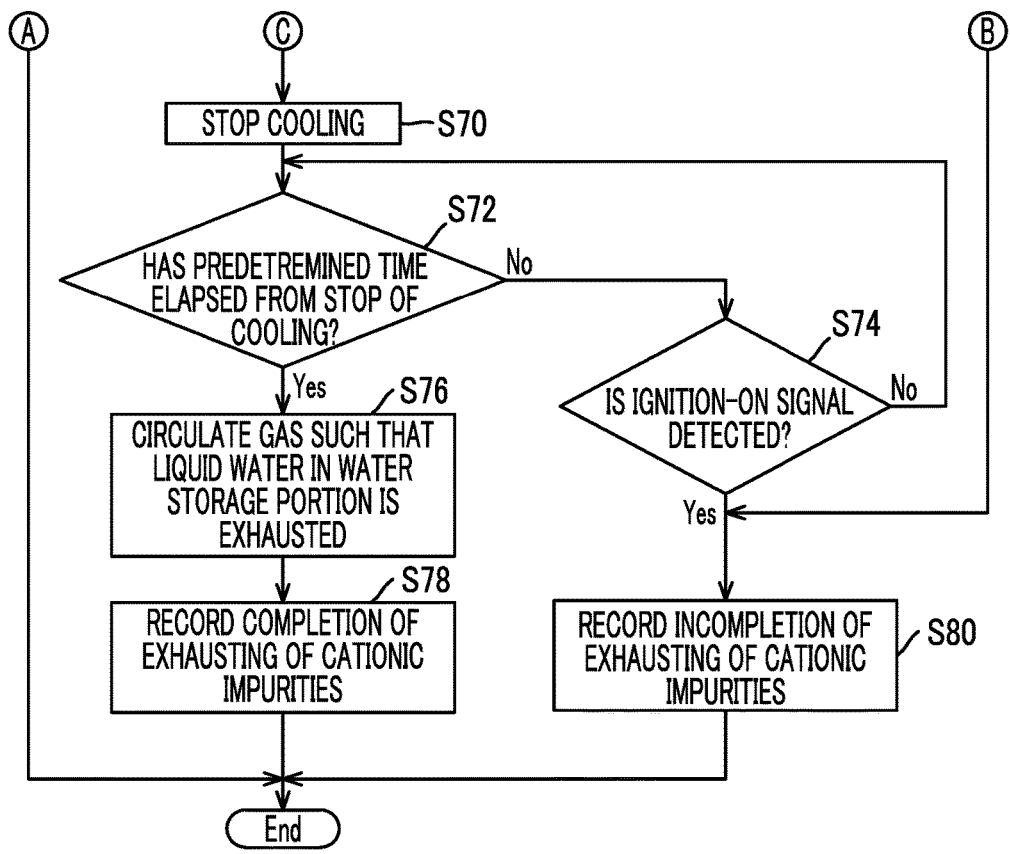
FIG. 26 is the flowchart (part 2) showing the example of the cationic impurity exhaust treatment using the control device in the fuel cell system according to the tenth embodiment.

Since a configuration of a fuel cell system according to a tenth embodiment is the same as in the ninth embodiment, the description thereof will not be repeated. FIGS. 25 and 26 show a flowchart showing an example of the cationic impurity exhaust treatment using the control device 110 in the fuel cell system according to the tenth embodiment. The flowchart shown in FIGS. 25 and 26 is different from the flowchart in FIGS. 23 and 24 in that Step S90 is added. In Step S90, in a case where it is determined that the temperature of the fuel cell 60 is the second predetermined temperature or higher in Step S56 (Step S56: No), the control device 110 determines whether or not an impedance value of the fuel cell 60 is lower than a predetermined value (for example, 80 mΩ). In a case where it is determined that the impedance value is lower than the predetermined value in Step S90 (Step S90: Yes), the control device 110 proceeds to Step S62. In a case where it is determined that the impedance value is the predetermined value or higher in Step S90 (Step S90: No), the control device 110 proceeds to Step S80. Since the other configurations are the same as those shown in FIGS. 23 and 24 of the ninth embodiment, the description thereof will not be repeated.

According to the tenth embodiment, even when the temperature of the fuel cell 60 is the second predetermined temperature or higher, in a case where the impedance value of the fuel cell 60 is the predetermined value or higher, the control device 110 performs the rapid cooling operation on the fuel cell 60 (Step S90). In a case where the impedance value of the fuel cell 60 is the predetermined value or higher, the membrane electrode assembly 10 is dry. Therefore, it is thought that, even when the rapid cooling operation is performed on the fuel cell 60, a large amount of dew condensation water is not produced in the vicinity of the membrane electrode assembly 10. Therefore, in this case, by not circulating air in the cathode gas passage 20, unnecessary power consumption is reduced, and the fuel efficiency can be improved.

In the seventh to tenth embodiments, the example in which air is circulated at a flow rate, which is higher than a gas flow rate corresponding to the amount of power generated based on a required output of the fuel cell 60, has been described. However, air may be circulated at a flow rate which is higher than a gas flow rate corresponding to the amount of power generated based on a maximum required output of the fuel cell 60. In this case, the exhausting of the liquid water 42 stored in the water storage portion 22 can be promoted, and the remaining of the liquid water 42 in the water storage portion 22 can be inhibited.

In the first to tenth embodiments, the example in which the water storage portion 22 and the liquid water connection portion 24 are provided on the cathode side has been described. However, the water storage portion 22 and the liquid water connection portion 24 may be provided on the anode side or provided on both the cathode side and the anode side.

The flowcharts shown in the seventh to tenth embodiments are merely exemplary. Some steps may be omitted, and another step may be added. For example, when the operation of the fuel cell 60 is stopped, a treatment of circulating gas in the gas passage such that the liquid water in the gas passage is temporarily exhausted may be added. However, in a case where the above-described treatment is not performed, the liquid water which has been present in advance in the gas passage and the dew condensation water produced by cooling are stored in the water storage portion. Therefore, it is preferable that the above-described treatment is not performed.

Hereinabove, the embodiments of the disclosure have been described in detail. However, the disclosure is not limited to the above-described embodiments, and various modifications and changes can be made within a range not departing from the scope of the disclosure.

What is claimed is:
1. A fuel cell comprising:
   a membrane electrode assembly in which an electrode catalyst layer is provided on both surfaces of an electrolyte membrane;
   a water-repellent layer that is disposed on at least one surface of the membrane electrode assembly; and
   a separator that is disposed on a surface of the water-repellent layer opposite to the membrane electrode assembly and includes a gas passage configured to circulate gas, which is supplied to the electrode catalyst layer, and an exhaust manifold connected to the gas passage, wherein the gas passage includes a water exhaust inhibiting portion and a water storage portion,
the water exhaust inhibiting portion is provided on a lowermost passage positioned on a lowermost side in a gravity direction in a state where the fuel cell is mounted on a vehicle in order to inhibit liquid water from being exhausted to the exhaust manifold,
the water storage portion is provided upstream of the water exhaust inhibiting portion such that liquid water is stored in the water storage portion by the water exhaust inhibiting portion, and
a liquid water connection portion is provided in the water-repellent layer so as to pass through the water-repellent layer from an electrode catalyst layer side to a separator side such that liquid water flows between the electrode catalyst layer and the water storage portion.

2. The fuel cell according to claim 1, wherein
the lowermost passage in the gas passage includes a first portion that extends in a direction intersecting the gravity direction and a second portion that extends upward from the first portion and is connected to the exhaust manifold,
the first portion functions as the water storage portion, and
the second portion functions as the water exhaust inhibiting portion.

3. The fuel cell according to claim 2, wherein
the first portion extends to a region immediately below the exhaust manifold.

4. The fuel cell according to claim 1, wherein
the water exhaust inhibiting portion is a water-repellent film that is provided on a wall surface of the lowermost passage.

5. The fuel cell according to claim 1, wherein
the water exhaust inhibiting portion is a protrusion that is provided in the lowermost passage.

6. The fuel cell according to claim 1, further comprising a gas diffusion layer that is provided between the water-repellent layer and the separator, wherein
the liquid water connection portion is provided so as to pass through the water-repellent layer and the gas diffusion layer from the electrode catalyst layer side to the separator side, and
the liquid water connection portion and the water storage portion are in contact with each other.

7. The fuel cell according to claim 1, wherein
the gas passage extends in a direction intersecting the gravity direction and includes a plurality of groove portions along the gravity direction, and
a sectional area of a groove portion where the water storage portion is provided among the plurality of groove portions is larger than sectional areas of other groove portions.

8. The fuel cell according to claim 1, wherein
a volume of the water storage portion is 20% or higher of a maximum water content of the membrane electrode assembly.

9. The fuel cell according to claim 1, wherein
the gas passage extends in a direction intersecting the gravity direction and includes a plurality of groove portions along the gravity direction, and
a length of the liquid water connection portion in the gravity direction is more than a width between one groove portion opposite to the liquid water connection portion among the plurality of groove portions and another groove portion adjacent to the one groove portion.

10. A fuel cell system, comprising:
the fuel cell according to claim 1; and
a gas flow rate controller configured to control a flow rate of gas circulating in the gas passage, wherein
when the fuel cell is stopped or activated, the gas flow rate controller is configured to circulate gas in the gas passage at a second gas flow rate which is higher than a first gas flow rate corresponding to an amount of power generated based on a required output for the fuel cell.

11. The fuel cell system according to claim 10, wherein the gas flow rate controller is configured to circulate gas at the second gas flow rate in a case where a total operating time or an immediately previous operating time of the fuel cell is a first predetermined time or longer, and is configured not to circulate gas at the second gas flow rate in a case where the total operating time or the immediately previous operating time is shorter than the first predetermined time.

12. The fuel cell system according to claim 10, wherein the gas flow rate controller is configured to circulate gas at the second gas flow rate in a case where an immediately previous stoppage time of the fuel cell is a second predetermined time or longer, and is configured not to circulate gas at the second gas flow rate in a case where the immediately previous stoppage time is shorter than the second predetermined time.

13. The fuel cell system according to claim 10, further comprising:
a coolant passage configured to circulate a coolant which is supplied to the fuel cell to cool the fuel cell;
a temperature detector that detects a temperature of the fuel cell; and
a coolant circulation controller that is configured to control circulation of the coolant in the coolant passage, wherein
the coolant circulation controller is configured to circulate the coolant in the coolant passage until the temperature of the fuel cell is lower than a first predetermined temperature after power generation of the fuel cell is stopped, and
the gas flow rate controller is configured to circulate gas at the second gas flow rate after the temperature of the fuel cell is lower than the first predetermined temperature and circulation of the coolant is stopped.

14. The fuel cell system according to claim 13, further comprising:
a power generation controller configured to cause, in a case where the temperature of the fuel cell is lower than a second predetermined temperature when a signal for stopping the fuel cell is received, the fuel cell to generate power until the temperature of the fuel cell is the second predetermined temperature or higher, wherein
the coolant circulation controller is configured to circulate the coolant in the coolant passage until the temperature of the fuel cell is lower than the first predetermined temperature after the temperature of the fuel cell is the second predetermined temperature or higher and the power generation of the fuel cell is stopped.

15. The fuel cell system according to claim 14, wherein the power generation controller is configured to cause the fuel cell to generate power until the temperature of the fuel cell is the second predetermined temperature or higher by reducing a supply amount of gas to be less than that during the power generation based on the required output for the fuel cell.

* * * * *